United States Patent [19]
Nishikawa et al.

[11] Patent Number: 5,830,393
[45] Date of Patent: Nov. 3, 1998

[54] PROCESS FOR PREPARING EXPANDED PRODUCT OF THERMOPLASTIC RESIN

[75] Inventors: Shigeo Nishikawa; Kaoru Yorita, both of Yokohama; Kouzo Ichikawa, Hadano; Haruo Inoue, Zushi; Michio Eriguchi, Yokohama; Takanori Sueda, Yokohama; Hideo Amemiya, Yokohama, all of Japan

[73] Assignee: Mitsui Chemicals, Inc., Tokyo, Japan

[21] Appl. No.: 887,323

[22] Filed: Jul. 2, 1997

[30] Foreign Application Priority Data

Oct. 7, 1996 [JP] Japan ................................. 8-180761
Oct. 7, 1996 [JP] Japan ................................. 8-180762
Oct. 7, 1996 [JP] Japan ................................. 8-180763

[51] Int. Cl.$^6$ ......................................... B29D 27/00
[52] U.S. Cl. ..................... 264/50; 264/45.3; 264/237; 264/DIG. 13; 521/79; 521/97; 521/143
[58] Field of Search ................... 264/45.3, 50, 237, 264/DIG. 13; 521/79, 97

[56] References Cited

U.S. PATENT DOCUMENTS 4,473,665  9/1984  Martini-Vvedensky et al. ........ 264/50
5,158,986  10/1992  Cha et al. .............................. 521/79

FOREIGN PATENT DOCUMENTS 8-11190  1/1996  Japan.

*Primary Examiner*—Morton Foelak
*Attorney, Agent, or Firm*—Burns, Doane, Swecker & Mathis, L.L.P.

[57] ABSTRACT

A process for preparing an expanded product of a thermoplastic resin which includes a gas dissolving step of adding supercritical carbon dioxide and/or nitrogen as an blowing agent to a thermoplastic resin, and melting it in the thermoplastic resin, a cooling step of cooling the resulting molten resin composition under a pressure not less than a critical pressure of the blowing agent, a nuclei forming step of discharging the molten resin composition from a die to lower the pressure to a level not more than the critical pressure, and an expansion controlling step of cooling an expanded product of the thermoplastic resin to a level not more than a glass transition temperature or a crystallization temperature of the resin to control a cell diameter of the expanded product.

11 Claims, 2 Drawing Sheets

PROCESS FOR PREPARING EXPANDED PRODUCT OF THERMOPLASTIC RESIN

BACKGROUND OF THE INVENTION

1. Field of the Invention

The present invention relates to an expanded product of a thermoplastic resin having excellent physical properties and surface appearance, and more specifically, it relates to a process for preparing an expanded product of a thermoplastic resin having a high strength, a very small average cell diameter and a uniform average cell density by the use of carbon dioxide and/or nitrogen as an blowing agent and by extrusion.

2. Description of the Related Art

For the preparation of an expanded product of a thermoplastic resin, there is known a process for preparing the expanded product of the thermoplastic resin by the use of a chemical blowing agent or a physical blowing agent.

A chemical expanding process usually comprises mixing a raw material resin with an organic blowing agent having a low molecular weight which can decompose at a molding temperature to generate a gas, and then heating the resulting mixture to a decomposition temperature of the blowing agent or more to carry out expansion molding. According to this process, the generation of the gas is sharply proportional to the molding temperature, and the decomposition temperature can easily be adjusted by adding an expanding aid or the like. Moreover, the expanded product having closed cells can also be obtained.

However, with regard to this expanded product, its cost increases owing to the use of the special blowing agent, and what is worse, the discoloration of the expanded product, the generation of an odor, a problem of food sanitation occur owing to some remaining decomposed residues in the expanded product. In addition, there are problems such as smears of a molding machine with the chemical blowing agent and molding defects caused by such smears.

On the other hand, a gas expanding process which is a physical expanding process comprises melting a resin in a molding machine, feeding an organic compound having a low boiling point such as butane, pentane or dichlorodifluoromethane to the molten resin, kneading them, and then releasing the mixture into a low-pressure zone to carry out expansion molding. The organic compound having the low boiling point which can be used in this process is compatible with the resin, and therefore it is excellent in solubility and retentivity, so that it has a feature which permits the formation of the expanded product having a high expansion ratio.

However, these blowing agents are expensive and have dangerous problems such as inflammability and toxicity as well as the possibility of air pollution. In addition, there is a tendency that the use of Freon-based gases typified by dichlorodifluoromethane is wholly banned in view of an environmental problem such as the destruction of an ozonosphere.

In order to solve such problems of the conventional processes, there have been suggested many processes in which an inert gas such as carbon dioxide gas or nitrogen is used as the blowing agent. However, the inert gas is less compatible with a resin and hence it is poor in solubility therein. In consequence, the obtained expanded product has large and uneven cell diameters and a low cell density, so that it is insufficient in points of appearance, mechanical strength, heat insulating properties and expansion ratio.

As a technique for solving these problems, U.S. Pat. No. 4,473,665 has disclosed a preparation process for obtaining an expansion-molded article in which fine cells having a diameter of 2 to 25 m are uniformly dispersed. In this process, a thermoplastic resin sheet is first impregnated under high pressure with an inert gas until it has been saturated. Afterward, the sheet is heated up to a glass transition temperature of the thermoplastic resin, and then depressurized so that the gas may be supersaturated in the resin to form cell nuclei. Next, the sheet is quenched to control the growth of the cells. Furthermore, another preparation process utilizing extrusion or injection molding has been exemplified which comprises heating and melting a thermoplastic resin beforehand saturated with an inert gas under pressure, shaping the molten resin under pressure, cooling and depressuring the resin to form cell nuclei, and then cooling the resin to control a cell diameter. According to the above-mentioned processes, the expanded products containing many fine cells therein can be obtained, but the inert gas is less compatible with the resin, and therefore ten and several hours are required to fully impregnate the resin with the gas, which makes it difficult to industrially practice these processes.

In U.S. Pat. No. 5,158,986, there has been disclosed a technique for obtaining an expanded product having an extremely fine cell diameter and a high cell density by using a supercritical fluid as the blowing agent and impregnating a thermoplastic resin with this supercritical fluid. Since the supercritical fluid has an excellent solubility similar to that of a liquid and an excellent diffusibility close to that of a gas, the supercritical fluid has a high solubility in the resin. In addition, since the supercritical fluid has a high diffusion rate in the resin, the impregnation of the resin with the blowing agent can be accomplished in a short period of time. In this U.S. patent publication, there have been proposed a process for obtaining an expanded product which comprises forming the thermoplastic resin into a sheet by an extruder, introducing the sheet into a pressurized chamber filled with carbon dioxide in a supercritical state to impregnate the sheet with carbon dioxide, and then heating the sheet in an expanding chamber under atmospheric pressure to allow the sheet to expand, and another process for obtaining an expanded product which comprises melting the resin in an extruder, impregnating the molten resin with carbon dioxide in a supercritical state, extruding the thus impregnated resin into a sheet-like product, introducing the sheet-like product into a pressurized chamber, in which cell nuclei are formed owing to a pressure difference, and then heating and cooling the sheet to control the diameter and the density of the cells.

In both the processes, however, large-scale high-pressure facilities are necessary and hence an enormous facilities cost is required, and a work efficiency is also poor. In consequence, it is difficult to practice these processes on an industrial scale. Furthermore, in the former process, a long time is taken to fully impregnate the sheet-like product with carbon dioxide, because the sheet-like product is directly impregnated therewith. On the other hand, in the latter process, the molten resin is impregnated with carbon dioxide, and hence the impregnation rate of carbon dioxide is higher than in the former process, but it is difficult to carry out the dissolution of carbon dioxide and the formation of many cell nuclei only by the kneading of one extruder, so that the expanded product having many fine cells can scarcely be obtained.

The present inventors have proposed, in Japanese Patent Application Laid-Open No. 11190/1996, a process for preparing an expanded thermoplastic resin product containing many fine cells in a uniform state by expansion extrusion which comprises a gas dissolving step of impregnating a molten thermoplastic resin with an inert gas as an blowing agent in a first extruder and an adapter having a mixing portion connected to the first extruder to form a compatible state of the thermoplastic resin and the inert gas, a cooling step of lowering the temperature of the molten resin in a second extruder, maintaining a pressurizing state, a nucleus-forming step of forming many cell nuclei owing to the abrupt drop in pressure, and an expansion controlling step of controlling the diameter of the cells.

According to this preparation process, it is possible to continuously perform the production of the expanded product which can scarcely practically be prepared by the preparation process disclosed in U.S. Pat. No. 4,473,665 or U.S. Pat. No. 5,158,986. However, from further researches by the present inventors, it has been confirmed that this preparation process has a limit to an effect of imparting strength to the extruded articles.

The expanded product of the thermoplastic resin having the excellent strength is required to have an optimum cell structure in points of a cell diameter distribution, a cell density and the like, and in order to obtain the expanded product of the thermoplastic resin having the excellent strength, it is an essential requirement to prepare the expanded product of the thermoplastic resin having the optimum cell structure.

The expanded product of the thermoplastic resin having the excellent strength is required to have the cell structure having a fine cell diameter and a very large number of cells, but in order to obtain such a cell structure, it is necessary that the opening of a die lip should be extremely decreased so as to apply a high shear to the molten resin. However, if the opening of the die lip is extremely decreased, the expanded product is thin and the expansion ratio is low, so that the desired expanded product cannot be obtained.

To the contrary, if the opening of the die lip is increased in order to prepare the thick expanded product, the high shear cannot be applied to the molten resin, so that the expanded product having the fine cell structure cannot be obtained.

Furthermore, in the case that a usual extrusion expanding process using the chemical blowing agent or the organic compound having a low boiling point as the blowing agent is employed, the expansion ratio and the thickness of the expanded sheet can be controlled only by adjusting the opening of the die lip. However, this expanding process has a limit to the amount of the blowing agent to be added, in contrast to the expanding process in which the supercritical fluid is used. In the usual extrusion expanding process, therefore, it is difficult to form many cells, and the increase of the cell diameter due to the increase of the opening of the die lip cannot be avoided. In consequence, the expanded product having the high strength cannot be prepared.

Examples of factors for controlling the cell diameter and the cell density of the expanded product of the thermoplastic resin include temperatures at the times of the cell nuclei formation and the cell nuclei growth, a viscosity, a resin pressure, the shear rate of the molten resin composition (hereinafter referred to simply as "the shear rate"), a gas concentration and the surface energy of the thermoplastic resin. The viscosity and the surface energy depend largely on a selected material, and the expansion ratio of the expanded product to be prepared depend largely on a working temperature and the concentration of the selected blowing agent.

That is to say, in order to obtain the expanded product of the thermoplastic resin having the necessary cell structure, it has heretofore been necessary that an optimum die shape and optimum molding conditions for the desired products are found, and each time the quality of the products is altered, the die is changed.

Furthermore, in the process disclosed in Japanese Patent Application Laid-Open No. 11190/1996, it is essential conditions that the shear rate in the die is increased by causing a rapid pressure loss in the die portion, and therefore if the shear rate is excessively increased, a flow velocity distribution in a slit portion within the die increases, so that a discharge rate is liable to be unstable. Accordingly, in the case that the expanded products of the thermoplastic resin having many fine cells in the uniform state are mass-produced, the discharge rate of the resin is not stable, so that the uneven discharge of the resin easily occurs and hence it is difficult to stably obtain the continuously extruded expanded products having a good surface appearance.

SUMMARY OF THE INVENTION

An object of the present invention is to obtain an extruded expanded product having a more excellent mechanical strength than an expanded product of a thermoplastic resin prepared by a usual extrusion expanding process.

Another object of the present invention is to obtain an expanded product of a thermoplastic resin having a fine cell structure for expressing an excellent strength by an extrusion expanding process in which a supercritical fluid is used as an blowing agent.

A still further object of the present invention is to prepare an expanded product of a thermoplastic resin having a high strength which can be used in a use of a structural member or the like in which the strength is required.

The present invention has been developed to provide a process for preparing an expanded product of a thermoplastic resin which is characterized by adjusting a resin pressure and a shear rate by a shear rate adjusting section 12 arranged in a die 4 at the time of expanding the resin in the vicinity of an outlet of the die 4 to optionally control a cell diameter and a cell density for expressing an excellent strength.

Furthermore, the present invention has been developed to provide a process for preparing an expanded product of a thermoplastic resin which can stably and evenly extrude the expanded product of the thermoplastic resin having a cell structure containing many fine cells in a uniform state and a good surface appearance.

The present inventors have intensively researched on a process for preparing an expanded product of a thermoplastic resin, and as a result, the present invention has been attained. That is to say, the present invention is directed to a process for preparing an expanded product of a thermoplastic resin by extrusion molding which comprises:

(I) a gas dissolving step of melting the thermoplastic resin at 100° to 450° C. in a continuous plasticator having a line for feeding an blowing agent, and adding supercritical carbon dioxide and/or nitrogen in a ratio of 0.1 to 30 parts by weight with respect to 100 parts by weight of the thermoplastic resin to form a molten resin composition in which the thermoplastic resin is compatible with supercritical carbon dioxide and/or nitrogen, (II) a cooling step of cooling, the molten resin composition to a temperature of 50° to 300° C. at a tip portion of the continuous plasticator, while maintaining a pressure not less than a critical pressure of supercritical carbon dioxide and/or nitrogen, (III) a nuclei cell forming step of discharging the molten resin composition from a die 4 connected to the tip portion of the continuous plasticator and set to an optimum expansion temperature of the molten resin composition, whereby the pressure is lowered to a level not more than the critical pressure of supercritical carbon dioxide and/or nitrogen to form cell nuclei, and (IV) an expansion controlling step of rapidly cooling the extruded product of the thermoplastic resin to a level not more than a glass transition temperature or a crystallization temperature of the resin to control a cell diameter of the expanded product, wherein the die in the step (III) has a flow velocity distribution adjusting section 13 having a function of lowering the shear rate on the downstream side of a shear rate adjusting section 12 having a function of generating the shear rate of the resin in the range of $10^2$ to $10^4$ sec$^{-1}$; this shear rate adjusting section includes a portion (an average sectional area A) in which a sectional area of a section vertical to a resin flow direction on the upstream, side of a resin flow path is narrowed; the flow velocity distribution adjusting section includes a portion (an average sectional area B) in which the same section is spread on the downstream side of the flow path; and B/A is in the range of 1.3 to 20.

BRIEF DESCRIPTION OF THE DRAWINGS

For a more complete understanding of the present invention, reference may be had to the following detailed description with reference to the accompanying drawings in which.

EXPLANATION OF SYMBOLS

1 . . . First extruder
2 . . . Connecting portion
3 . . . Second extruder
4 . . . Die
5 . . . Cooler
6 . . . Hopper
7 . . . Gas bomb
8 . . . Plunger pump
9 . . . Screw
10 . . . Expanded sheet
11 . . . Die
12 . . . Shear rate adjusting section
13 . . . Flow velocity distribution adjusting section

DESCRIPTION OF THE PREFERRED EMBODIMENTS

Described specifically, the present invention embraces therein the following embodiments:

(a) A process for preparing an expanded product of a thermoplastic resin by extrusion molding which comprises:

(I) a gas dissolving step of melting of the thermoplastic resin at 100° to 450° C. in a continuous plasticator having a line for feeding an blowing agent, and adding supercritical carbon dioxide and/or nitrogen in a ratio of 0.1 to 30 parts by weight with respect to 100 parts by weight of the thermoplastic resin to form a molten resin composition in which the thermoplastic resin is compatible with supercritical carbon dioxide and/or nitrogen, (II) a cooling step of cooling, the molten resin composition to a temperature of 50° to 300° C. at a tip portion of the continuous plasticator, while maintaining a pressure not less than a critical pressure of supercritical carbon dioxide and/or nitrogen, (III) a nuclei cell forming step of discharging the molten resin composition from a die 4 connected to the tip portion of the continuous plasticator and set to an optimum expansion temperature of the molten resin composition, whereby the pressure is lowered to a level not more than the critical pressure of supercritical carbon dioxide and/or nitrogen to form cell nuclei, and (IV) an expansion controlling step of rapidly cooling the extruded product of the thermoplastic resin to a level not more than a glass transition temperature or a crystallization temperature of the resin to control a cell diameter of the expanded product, wherein the die in the step (III) has a flow velocity distribution adjusting section 13 having a function of lowering the shear rate on the downstream side of a shear rate adjusting section 12 having a function of generating the shear rate of the resin in the range of $10^2$ to $10^4$ sec$^{-1}$; this shear rate adjusting section includes a portion (an average sectional area A) in which a sectional area of a section vertical to a resin flow direction on the upstream side of a resin flow path is narrowed; the flow velocity distribution adjusting section includes a portion (an average sectional area B) in which the same section is spread on the downstream side of the flow path; and B/A is in the range of 1.3 to 20.

(b) The process for preparing an expanded product of a thermoplastic resin according to the paragraph (a) wherein the die has a function of changing a sectional area of the shear rate adjusting section.

(c) The process for preparing an expanded product of a thermoplastic resin according to the paragraph (a) wherein a resin pressure at an inlet of the shear rate adjusting section 12 is in the range of 50 to 400 kg/cm$^2$.

(d) The process for preparing an expanded product of a thermoplastic resin according to the paragraph (a) wherein a ratio C/A between the average sectional area A of the shear rate adjusting section 12 and a sectional area C of the obtained expanded product of the thermoplastic resin is in the range of 2 to 200.

(e) The process for preparing an expanded product of a thermoplastic resin according to the paragraph (a) wherein the continuous plasticator is a tandem type extruder.

(f) The process for preparing an expanded product of a thermoplastic resin according to the paragraph (a) wherein the continuous plasticator is one extruder.

(g) The process for preparing an expanded product of a thermoplastic resin according to the paragraph (a) wherein carbon dioxide and/or nitrogen is dissolved in the thermoplastic resin in a ratio of 2 to 20 parts by weight with respect to 100 parts by weight of the thermoplastic resin.

(h) The process for preparing an expanded product of a thermoplastic resin according to the paragraph (a) wherein a raw material to be used contains the thermoplastic resin, supercritical carbon dioxide and/or nitrogen, and an inorganic fine powder and/or an aliphatic carboxylic acid derivative.

(i) The process for preparing an expanded product of a thermoplastic resin according to the paragraph (h) wherein the inorganic fine powder is talc.

(k) The process for preparing an expanded product of a thermoplastic resin according to the paragraph (h) wherein the aliphatic carboxylic acid derivative is a derivative of stearic acid.

(l) The process for preparing an expanded product of a thermoplastic resin according to the paragraph (k) wherein the aliphatic carboxylic acid derivative is zinc stearate.

(m) An extruded expanded product of a thermoplastic resin wherein an Izod impact strength of an expanded product prepared by applying shear in a shear rate adjusting section 12 so that a molten resin composition may expand is 1.2 to 3 times as much as that of an expanded product prepared by a die not having the shear rate adjusting section 12.

(n) An extruded expanded product of a thermoplastic resin wherein an Izod impact strength of an expanded product prepared by applying shear in a shear rate adjusting section 12 so that a molten resin composition may expand is 1.2 to 3 times as much as that of an unexpanded test peace.

(o) The extruded expanded product of a thermoplastic resin according to the paragraph (m) and (n) wherein an average cell diameter is in the range of 0.01 to 50 m, and an average cell density is in the range of $10^8$ to $10^{16}$ cells/cm$^3$.

This application is based on Application Nos. Hei-8-180761/1996, Hei-8-180762/1996 and Hei-8-180763/1996 filed on Jul. 10, 1996, Jul. 10, 1996 and Jul. 10, 1996, respectively, in Japan, the contents of which are incorporated herein by reference.

A device and a process designed for the present invention will be described with reference to FIG. 1.

A resin is fed to a first extruder 1 having a line for feeding an blowing agent which constitutes an inlet side of a continuous plasticator, and supercritical carbon dioxide and/or nitrogen is then introduced, while the resin is heated and molten, to form a molten resin composition in which the resin is compatible with the blowing agent.

Afterward, the molten resin composition is forwarded to a second extruder 3 which constitutes an outlet side of the continuous plasticator, and a temperature of the composition is slowly lowered to temperature conditions which are most suitable for expansion. At this time, the pressure and temperature conditions of a tip portion of the second extruder 3 are required to be not less than a critical pressure and not less than a critical temperature of carbon dioxide and/or nitrogen, i.e., to be in a supercritical state.

Preferably, at a connecting portion 2 between the first extruder 1 and the second extruder 3, an adapter having a mixing portion is disposed. In consequence, the mixing of the molten thermoplastic resin and carbon dioxide and/or nitrogen can further be advanced, whereby the compatible state of the thermoplastic resin and carbon dioxide and/or nitrogen can easily be formed, and the resin which is in a molten state by controlling the temperature by the adapter can easily be cooled so as to have a viscosity suitable for the subsequent expansion.

No particular restriction is put on the kind of adapter having this mixing portion, but there can suitably be used an adapter having a static mixer therein by which the kneading and the cooling of the resin can be carried out.

However, so long as the compatible state of the molten resin composition can be formed and the composition can be cooled to the optimum expanding temperature in the first extruder 1, the continuous plasticator need not be a tandem type expanding extruder using the second extruder 3, and one extruder may be used.

Next, the molten resin composition is forwarded to a die 4 connected to a tip portion of the continuous plasticator set to the optimum expanding temperature, and the pressure is then reduced in a shear rate adjusting section 12 which can generate a shear rate in the range of $10^2$ to $10^4$ sec$^{-1}$, thereby starting expansion.

Here, the shear rate of the molten resin (a Newtonian fluid) in the die 4 can generally be represented by the equation 1 or the equation 2.

In the case that the die is circular:
Equation 1

$$\gamma = 32Q/\pi D^3 \tag{1}$$

In the case that the die has parallel grooves:
Equation 2

$$\gamma = 6Q/TH^2 \tag{2}$$

wherein $\gamma$ is a shear rate (sec$^{-1}$), Q is a volume extrusion rate (cm$^3$/sec), D is a pipe diameter (cm), T is a width (cm), and H is a thickness (cm).

The shear rate in this specification of the present invention has been calculated in accordance with the above-mentioned shear rate equation.

Furthermore, the shear rate adjusting section 12 means a site in which the optimum shear rate and a pressure loss occur for the molten resin composition in the die 4. The shear rate can be adjusted so as to be in the range of $10^2$ to $10^4$ sec$^{-1}$ by decreasing a size (a width T and a thickness H) of a sectional area of the surface vertical to a resin flow direction in the above-mentioned site.

No particular restriction is put on the shape of the site, and it may be any of parallel grooves, circles and the like. Moreover, the site may have a shape such as an orifice at which a parts having a predetermined shape can be replaced with another.

Furthermore, the site may be a variable type such as a chalk bar which can change the size or the shape of the shear rate adjusting section 12 even during the preparation.

In addition, the site may be an automatically variable type which can sense the resin pressure in the die 4, the flow velocity of the resin, the shape of the expanded product or the like and which can automatically alter the size or the shape of the shear rate adjusting section 12.

In this specification, the molten resin composition means a uniform mixture of carbon dioxide and/or nitrogen as the blowing agent and the molten resin composition, or a similar uniform mixture in which cells are formed and the resin is not completely solidified.

No particular restriction is put on the thermoplastic resin which can be used in the present invention, so long as its plasticizing temperature is in the range of 100° to 450° C. Examples of the thermoplastic resin include polystyrene resins (e.g., polystyrene, butadiene-styrene copolymer, acrylonitrile-styrene copolymer, acrylonitrile-butadiene-styrene copolymer, and the like), ABS resin, polyethylene, polypropylene, ethylene-propylene copolymer resin, ethylene-ethyl acrylate resin, polyvinyl chloride, polyvinylidene chloride, polybutene, polycarbonates, polyacetals, polyphenylene oxide, polyvinyl alcohol, polymethyl methacrylate, saturated polyester resins (e.g., polyethylene terephthalate, polybutylene terephthalate, and the like), biodegradable polyesters (e.g., hydroxycarboxylic condensation products such as polylactic acid, diol-dicarboxylic acid condensation products such as polybutylene succinate, and the like), polyamide resins, polyimide resins, fluorinated resins, polysulfones, polyethersulfones, polyarylates, polyether ether ketones and liquid crystal polymers. These compounds can be used singly or in the form of a mixture of two or more thereof. Among these thermoplastic resins, styrene-base resins and polyolefin-base resins are preferable, and polystyrene and polypropylene are particularly preferable.

A melt flow index of each thermoplastic resin measured in the vicinity of a processing temperature is in the range of 0.05 to 60 g/10 minutes, preferably 0.1 to 40 g/10 minutes, more preferably 0.2 to 20 g/10 minutes.

In this case, the measuring conditions, i.e., a measuring temperature and a load can be set on the basis of conditions of ASTM specified for each resin. For example, in the case of polypropylene, the measuring temperature and the load can be set to 230° C. and 2.16 kgf/cm$^2$, respectively, and in the case of polystyrene, the measuring temperature and the load can be set to 200° C. and 5.0 kgf/cm$^2$, respectively. For other resins, the measurement can be made under conditions specified in ASTM D1238.

If the melt flow index is in the vicinity of and not less than the lower limit of the above-mentioned range, a resin viscosity at the time of the melting is suitable, so that the load of an extruder is not excessive and the processing is easy. On the other hand, if the melt flow index is in the vicinity of and not more than the upper limit of the above-mentioned range, the resin can withstand a gas pressure during the expansion and can maintain the viscosity, so that the fine cells can be formed without the collapse of the cells. In compliance with these indexes, the melt index of the resin to be used can suitably be selected.

The melt flow index of the thermoplastic resin to be used can suitably be selected in compliance with a purpose by a person skilled in the art. For example, if polypropylene, polystyrene or the like having a melt flow index of 10 to 60 g/10 minutes is used, a product having a high expansion ratio can easily be obtained. On the other hand, if a resin having a melt flow index of 0.05 to 10 g/10 minutes is used, solidification by cooling progresses promptly, so that a cooling time can be shortened, which leads to the improvement of productivity.

The amount of supercritical carbon dioxide and/or nitrogen which can be used as the blowing agent is in the range of 0.1 to 30 parts by weight, preferably 0.2 to 20 parts by weight, more preferably 2 to 20 parts by weight with respect to 100 parts by weight of the thermoplastic resin composition.

If the amount of the blowing agent is less than 0.1 part by weight, the expanded product having a fine average cell diameter cannot be obtained, and on the other hand, if it is more than 30 parts by weight, the expanded product has a blister-like defective appearance, so that it is difficult to obtain a beautiful surface appearance.

Supercritical carbon dioxide or nitrogen which can be used as the blowing agent can be used singly, but carbon dioxide and nitrogen may be used in the form of a mixture thereof. In this case, a mixing ratio between supercritical carbon dioxide and nitrogen is preferably in the range of 1:9 to 9:1. In the case that the thermoplastic resin for the expanded product is a polyester resin such as PET, PBT or polylactic acid, a polycarbonate, a polyamide or the like, the combination use of carbon dioxide and nitrogen as the blowing agents is more preferable than the single use of carbon dioxide, because the combination use permits the formation of the fine cells and the increase of the cell density.

No particular restriction is put on a method for mixing the blowing agent with the molten resin composition in the continuous plasticator, but there are, for example, a method which comprises injecting gaseous carbon dioxide and/or gaseous nitrogen under pressure, or a method which comprises injecting liquid carbon dioxide and/or nitrogen by the use of a plunger pump or the like.

Carbon dioxide and/or nitrogen is required to be in a supercritical state in the continuous plasticator from the viewpoints of solubility in the molten resin composition, penetrability, diffusibility and the like.

Moreover, in the present invention, the thermal decomposition type blowing agent, which can generate carbon dioxide or nitrogen by the thermal decomposition, can be used as an expanding nucleating agent for uniforming the expansion together with carbon dioxide and/or nitrogen. Examples of the thermal decomposition type blowing agent include azodicarbonamide, N,N-dinitrosopentatetramine, azobisisobutyronitrile, citric acid and sodium hydrogencarbonate. In the case that the thermal decomposition type blowing agent is used, its amount is in the range of 0.1 to 10 parts by weight with respect to 100 parts by weight of the thermoplastic resin.

In order to obtain the cells having a fine diameter, it is possible to add one or more of various foam stabilizers to the thermoplastic resin for use in the present invention. The known foam stabilizers can be used which have been used in the usual expansion molding, but for example, organopolysiloxanes, aliphatic carboxylic acids and derivatives thereof can suitably be used.

Examples of the organopolysiloxanes include polydimethylsiloxane, polydiphenylsiloxane, polymethylphenylsiloxane and polymethylhydrogensiloxane, and modified organopolysiloxanes obtained by modifying these organopolysiloxanes with epoxy group-containing compounds, amino group-containing compounds, ester bond-containing compounds or the like. Among these compounds, polydimethylsiloxane is preferable from the viewpoints of dispersibility and solubility in the resin as well as the improvement effect of a surface appearance.

When the modified organopolysiloxane is used, a radical-producing agent such as a peroxide can be added, whereby the compatibility with the resin can be improved.

Furthermore, examples of the aliphatic carboxylic acids and derivatives thereof include aliphatic carboxylic acids, acid anhydrides, alkali metal salts, alkali earth metal salts and fluoroalkane esters. Suitable examples of the aliphatic carboxylic acids include aliphatic carboxylic acids having 3 to 30 carbon atoms, and suitable typical examples thereof include lauric acid, stearic acid, crotonic acid, oleic acid, maleic acid, glutaric acid and montanic acid. Suitable examples of the fluoroalkane esters include fluoroalkane esters having fluoroalkane groups derived from alkyl groups having 3 to 30 carbon atoms. From the viewpoints of the dispersibility, the solubility, the surface appearance improvement effect and the like, preferable examples of the foam stabilizer include stearic acid, stearic acid derivatives, montanic acid, montanic acid derivatives, alkali metal salts and alkali earth metal salts of stearic acid, fluoroalkane esters of montanic acid, and above all, particularly preferable examples thereof include zinc stearate, calcium stearate and perfluoroalkane esters of montanic acid.

The amount of the foam stabilizer is in the range of 0.1 to 10 parts by weight, preferably 0.2 to 8 parts by weight, more preferably 0.3 to 5 parts by weight with respect to 100 parts by weight of the thermoplastic resin.

If the amount of the foam stabilizer is more than 0.1 part by weight, the fine cells can easily be formed in the expanded product, and if it is less than 10 parts by weight, the resin can maintain a viscosity enough to withstand the gas pressure during the expansion and the fine cells can be formed without the collapse of the cells.

Furthermore, in the present invention, there can be used inorganic fine powder which functions as an expansion nucleating agent for the thermoplastic resin composition. Examples of the inorganic fine powder include talc, calcium carbonate, clay, magnesium oxide, zinc oxide, glass beads, glass powder, titanium oxide, carbon black and anhydrous silica. Among these examples, talc, calcium carbonate, titanium oxide and anhydrous silica are preferable, and talc is particularly preferable. The particle diameter of the inorganic fine powder is preferably 50 $\mu$m or less, more preferably 10 $\mu$m or less, most preferably 5 $\mu$m or less.

If the inorganic fine powder having a particle diameter of 50 $\mu$m or less is used, the cell diameter of the expanded product can be decreased, so that the Izod impact strength of the expanded product can be improved.

In the case that the inorganic fine powder is added, the amount of the inorganic fine powder is in the range of 0.01 to 40 parts by weight, preferably 0.05 to 20 parts by weight, more preferably 0.05 to 10 parts by weight, most preperably 0.1 to 5 parts by weight with respect to 100 parts by weight of the thermoplastic resin composition.

If the amount of the inorganic fine powder is more than 0.01 part, a strength impartment effect can easily be exerted, and if it is less than 40 parts by weight, the surface appearance of the expanded product is conveniently good.

To the resin composition, there can be added additives other than the above-mentioned inorganic fine powders, the aliphatic carboxylic acids and the derivatives thereof, so long as the characteristics of the present invention are not impaired. Examples of such additives include elastomers and thermoplastics such as ethylene-propylene rubber, ethylene-butene rubber, propylene-butene rubber, hydrogenation products of styrene-butadiene block copolymers, hydrogenation products of styrene-butadiene-styrene triblock copolymers, hydrogenation products of styrene-isoprene diblock copolymers, hydrogenation products of styrene-isoprene-styrene triblock copolymers, low-density polyethylene, high-density polyethylene, linear low-density polyethylene, ultralow-density polyethylene, ethylene-ethyl acrylate copolymers, ethylene-vinyl acetate copolymers and polybutene, plasticizers, pigments, stabilizers, fillers, and metal powders. These additives can suitably be used in compliance with a purpose and a use.

No particular restriction is put on the preparation process of the thermoplastic resin composition which is the raw material for the expanded product of the thermoplastic resin according to the present invention, and a usual known preparation process can be employed. For example, the thermoplastic resin composition can be prepared by uniformly mixing the thermoplastic resin and, if necessary, an additive such as an organopolysiloxane or a fluoroalkane ester of an aliphatic carboxylic acid by a high-speed stirrer or the like, and then melting and kneading the resulting mixture by a single screw extruder or a multi-screw extruder, a mixing roll, a kneader, a Brabender mixer or the like which has a sufficient kneading ability. Alternatively, the thermoplastic resin and the organopolysiloxane or the fluoroalkane ester of the aliphatic carboxylic acid may also be used in a uniformly mixed state.

The gas dissolving step in the present invention for forming a mutually dissolved state of the thermoplastic resin composition and carbon dioxide and/or nitrogen comprises heating and melting the resin composition in a first extruder 1 constituting an inlet side of a continuous plasticator, adding supercritical carbon dioxide and/or nitrogen to the molten resin composition, and then uniformly mixing them. The cooling step comprises cooling the molten resin composition on an outlet side of the continuous plasticator to make adjustment so that the resin composition may have a viscosity suitable for the expansion.

The nuclei forming step comprises lowering a pressure in the die 4 in which the shear rate adjusting section 12 is arranged on a resin flow path, to a critical pressure or less, whereby carbon dioxide and/or nitrogen is surpersaturated and many cell nuclei are formed in the molten resin composition.

The expansion controlling step comprises rapidly cooling the expanded sheet 10 to a level not more than a glass transition temperature or a crystallization temperature of the resin to control the growth of the formed cells and to uniform many fine cells.

At least the gas dissolving step and the cooling step of these steps are conducted as follows in accordance with a procedure described in a claim and some examples of Japanese Patent Application Laid-Open No. 11190/1996.

The thermoplastic resin is fed through a hopper 6 to the first extruder 1 constituting the inlet side of the continuous plasticator, and in this extruder, the resin is heated and molten at 100° to 450° C. Furthermore, carbon dioxide and/or nitrogen is forwarded to a plunger pump 8 via a gas bomb 7, and in the plunger pump, a pressure is increased, so that carbon dioxide and/or nitrogen having the controlled pressure is then fed to the molten resin composition in the first extruder 1.

At this time, the dissolution and the diffusion of carbon dioxide and/or nitrogen in the resin composition present in the first extruder 1 can remarkably be heightened, so that the impregnation of the resin composition with carbon dioxide and/or nitrogen can be accomplished in a short period of time. In consequence, a critical pressure or more and a critical temperature or more of carbon dioxide and/or nitrogen can be maintained in the system.

Moreover, carbon dioxide and/or nitrogen fed to the first extruder 1 is heated and pressurized in this extruder, whereby it becomes a supercritical state, or carbon dioxide and/or nitrogen is heated and pressurized prior to feeding it to the first extruder 1, and the supercritical carbon dioxide and/or nitrogen is then fed thereto.

In the first extruder 1, the molten resin composition and carbon dioxide and/or nitrogen are kneaded by a screw 9 to form a mutually dissolved state of the thermoplastic resin composition and carbon dioxide and/or nitrogen.

After the mutual dissolution, in the cooling step, the molten resin composition is cooled to 50° to 300° C., preferably 80° to 280° C., more preferably 80° to 180° C. and to a plasticizing temperature or more of the molten resin composition by controlling a temperature of a tip of the second extruder 3, whereby adjustment is made so that the resin composition may have a viscosity suitable for the subsequent expansion.

An embodiment of the present invention will be described with reference to drawings. In FIGS. 1 to 5, reference numeral 1 is a first extruder, numeral 2 is a connecting portion, 3 is a second extruder, 4 is a die, 5 is a cooler, 6 is a hopper, 7 is a gas bomb, 8 is a plunger pump, 9 is a screw, 10 is an expanded sheet, 11 is a die, 12 is a shear rate adjusting section, and 13 is a flow velocity distribution adjusting section.

Figure 1:
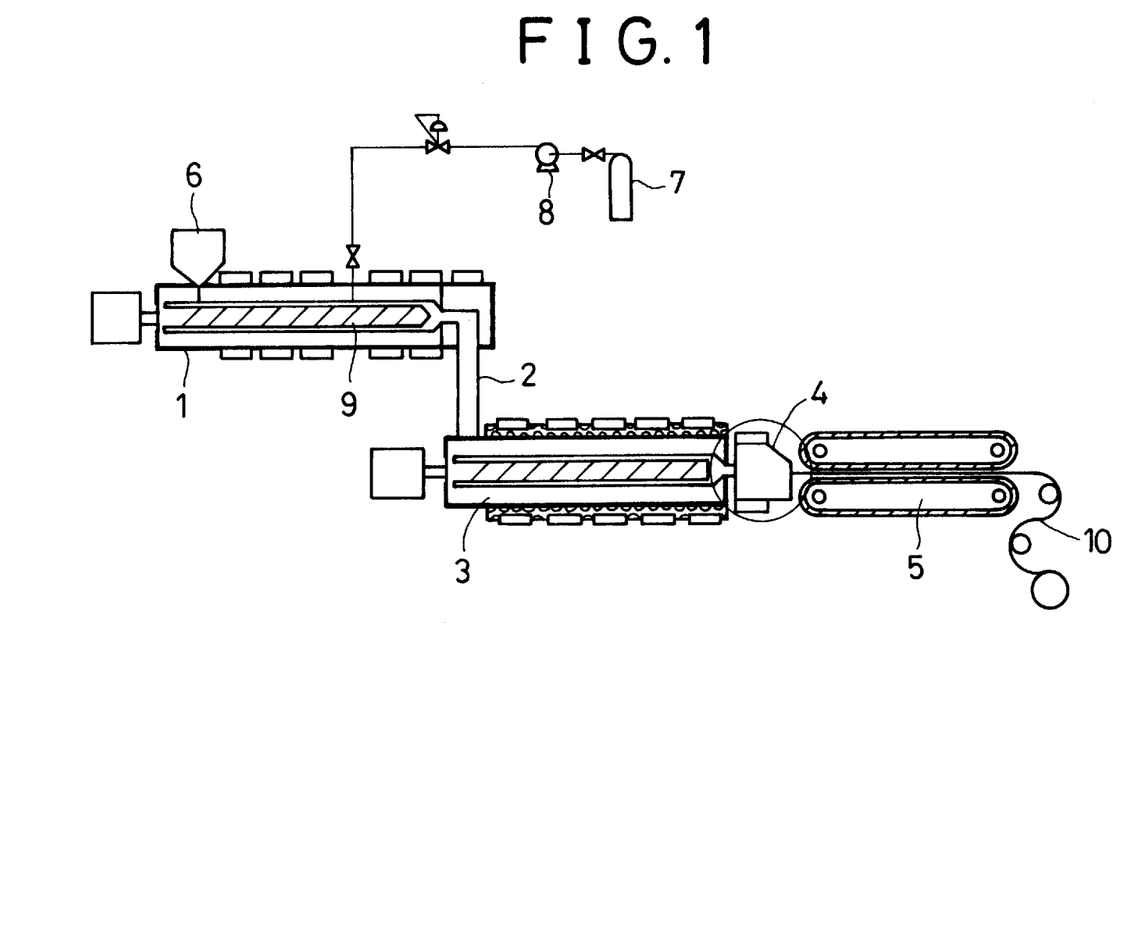
FIG. 1 is a schematic constitutional view showing a process for preparing an expanded product of a thermoplastic resin according to the present invention.
Figure 2:
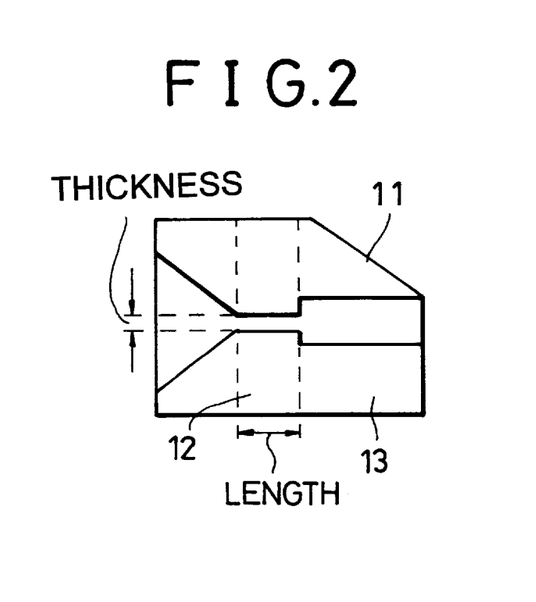
FIG. 2 is a schematic constitutional view showing a die 4 having a shear rate adjusting section 12 and flow velocity distribution adjusting section 13 on a resin flow path which can be used in the process for preparing the expanded product of the thermoplastic resin according to the present invention.

Referring to FIG. 1, in the gas dissolving step, 100 parts by weight of the thermoplastic resin is fed to the first extruder 1 constituting the inlet side of the continuous plasticator through the hopper 6, and then heated and molten. On the other hand, carbon dioxide and/or nitrogen is forwarded to the plunger pump 8 via the gas bomb 7, and in the plunger pump, a pressure is increased, so that 0.1 to 30 parts by weight of carbon dioxide and/or nitrogen having the controlled pressure is then fed to the molten resin composition in the first extruder 1, whereby the gas dissolving step can be accomplished. At this time, the dissolution and the diffusion of carbon dioxide and/or nitrogen in the resin composition present in the first extruder 1 can remarkably be heightened, so that the impregnation of the resin composition with carbon dioxide and/or nitrogen can be carried out in a short period of time. Therefore, the system is required to be maintained at a critical pressure or more and a critical temperature or more of carbon dioxide and/or nitrogen. For example, in the case of carbon dioxide, the critical pressure is 75.3 kg/cm$^2$ and the critical temperature is 31.35° C., and on the other hand, in the case of nitrogen, the critical pressure is 33.5 kg/cm$^2$ and the critical temperature is −147.0° C. In the first extruder 1, the pressure is in the range of 75 to 400 kg/cm$^2$, preferably 100 to 300 kg/cm$^2$, and the temperature is in the range of 100° to 450° C., preferably 110° to 280° C.

Furthermore, carbon dioxide and/or nitrogen fed to the first extruder 1 is heated and pressurized to become a supercritical state, or alternatively, carbon dioxide and/or nitrogen is heated and pressurized prior to feeding it to the first extruder 1, and the supercritical carbon dioxide and/or nitrogen is then fed thereto.

In the first extruder 1, the molten resin composition and carbon dioxide and/or nitrogen are kneaded by the screw 9 to form a mutually dissolved state of the thermoplastic resin composition and carbon dioxide and/or nitrogen. After the mutual dissolution, in order to enhance the solubility of carbon dioxide and/or nitrogen in the thermoplastic resin in the cooling step, the molten resin composition is forwarded to the second extruder 3 which constitutes an outlet side of the continuous plasticator, and the molten resin composition is cooled to a temperature suitable for the expansion, while the critical pressure or more is maintained.

At this time, the molten resin composition is cooled to 50° to 300° C., preferably 80° to 280° C. more preferably 80° to 180° C. and to a plasticizing temperature or more of the molten resin composition, whereby adjustment is made so that the resin composition may have a viscosity suitable for the subsequent expansion.

In this cooling step using the second extruder 3, the temperature conditions suitable for the cell formation can be attained without any difficulty. When the sufficient cooling is done in this step, the expanded product of the thermoplastic resin according to the present invention can continuously and stably be prepared. However, in the case that the molten resin composition can sufficiently be cooled to the temperature suitable for the expansion only by the first extruder 1 which is the continuous plasticator, it is not necessary to connect the second extruder 3 to the outlet side of the continuous plasticator, and hence the expanded product can also be prepared by the single extruder.

Furthermore, in order to improve the dissolution state of carbon dioxide and/or nitrogen in the molten resin composition, it is more preferable that a kneading portion having a static mixer is connected to the connecting portion 2 of the first extruder 1 and the second extruder 3.

Next, the molten resin composition is forwarded to the die 4 connected to the outlet side of the continuous plasticator set to an optimum expanding temperature, and shear is then applied to the molten resin composition by the use of a parts having an optimum shape and size for generating a shear rate in the range of $10^2$ to $10^4$ sec$^{-1}$ in the shear rate adjusting section 12, whereby the expansion is started. Afterward, pressure reduction is carried out under conditions controlled by the shear rate adjusting section 12 without causing the abrupt pressure reduction at the die outlet, so that carbon dioxide and/or nitrogen becomes an surpersaturation state.

The surpersaturated molten resin composition is thermally unstable to form many cells. It is known that in general, a glass transition temperature of a resin containing a gas lowers in proportion to the content of the gas, but the temperature in the die 4 is preferably not less than the glass transition temperature of the resin impregnated with the gas.

Furthermore, at this time, the pressure of the resin composition at the inlet of the shear rate adjusting section 12 is preferably in the range of 50 to 400 kg/cm$^2$, and the pressure at the outlet of the shear rate adjusting section 12 is preferably the critical pressure or more of the blowing agent and in the range of about 30 to 100 kg/cm$^2$.

For example, in the case that the thermoplastic resin is a styrene resin and 3 to 12 parts by weight of carbon dioxide as the blowing agent is dissolved therein, the pressure of the resin composition at the inlet of the shear rate adjusting section 12 is preferably in the range of 50 to 400 kg/cm$^2$, and the pressure of the resin composition at the outlet of the shear rate adjusting section 12 is preferably in the range of 75 to 100 kg/cm$^2$.

No particular restriction is put on the shape of the shear rate adjusting section 12, but this shape is required to be such that the molten resin composition expands in the die 4 after the passage of the shear rate adjusting section 12. Thus, the shape of the shear rate adjusting section 12 is suitably parallel grooves, circles or the like, and these parallel grooves or circles may be used singly or plurally.

The inside of the die is required to have a structure containing the portion (the shear rate adjusting section) in which a sectional area of a section vertical to a resin flow direction on the upstream side of a resin flow path is decreased, and the other portion (the flow velocity distribution adjusting section) in which a similar sectional area on the downstream side thereof is increased.

The shear rate adjusting section 12 and the flow velocity distribution adjusting section 13 may have constant sectional areas, respectively, and each section of the flow path may have, for example, an inclination in the middle of the flow path, but a sectional area of the minimum portion of the flow velocity distribution adjusting section 13 is required to be larger than a sectional area of the maximum portion of the shear rate adjusting section 12.

A sectional area A of the shear rate adjusting section 12 and a sectional area B of the flow velocity distribution adjusting section 13 denote average sectional areas of the respective sections.

Next, the molten resin composition is passed through the flow velocity distribution adjusting section 13 having such a sectional area B that an area ratio B/A between the sectional area B of the flow velocity distribution adjusting section 13 and the sectional area A of the shear rate adjusting section 12 is preferably in the range of 1.3 to 20, more preferably 1.5 to 20, whereby the shear rate is lowered and the flow velocity distribution in a width direction is decreased.

A temperature at the outlet of the flow velocity distribution adjusting section 13 is maintained at 60° to 200° C., preferably 80° to 180° C. and at a plasticizing temperature or more of the molten resin composition.

In the case that the thermoplastic resin is a styrene resin and 3 to 12 parts by weight of carbon dioxide as the blowing agent is dissolved therein, the resin pressure in the flow velocity distribution adjusting section 13 is preferably in the range of 1 to 75 kg/cm$^2$. In addition, a resin temperature at the time of the expansion is preferably in the range of 80° to 150° C., more preferably 100° to 130° C.

The molten resin composition in which the expansion has started is passed through the flow velocity distribution adjusting section 13, after the passage of the shear rate adjusting section 12. With the vaporization of the gas, the temperature lowers, so that the expanded product begins to solidify. This expanded product is then extruded through the outlet of the die 4.

The shape of the obtained expanded product depends on the shape of the flow velocity distribution adjusting section 13, and for example, a parallel groove shape, a circular shape, a rectangular shape or a hollow shape can be selected in compliance with the desired shape of the expanded product. In general, a part having such a shape is used, but there may be used a variable type such as a chalk bar which can change the size or the shape of the flow velocity distribution adjusting section 13 even during the preparation.

The size of the obtained expanded product of the thermoplastic resin is such that a ratio C/A between the sectional area A of the shear rate adjusting section 12 and a sectional area C of the expanded product of the thermoplastic resin is in the range of 2 to 200. In addition, C/A is preferably in the range of 3 to 180, more preferably 5 to 150.

Next, in the expansion controlling step, the resulting expanded sheet 10 is passed through a cooler 5 to rapidly cool the expanded sheet 10 to the glass transition temperature or the crystallization temperature or less of the resin, whereby the growth of the formed cells is controlled, so that the expanded product of the thermoplastic resin having many fine cells in a uniform state is stably prepared without uneven discharge.

In the present invention, the pressure more than the critical pressure of the blowing agent is required to be always maintained so that the molten resin composition may not be separated into the resin and the gas until the dissolving step and the cooling step have been completed. Once the molten resin composition is separated into the resin and the gas, the compatible state of the resin and the gas cannot be obtained any more even by increasing the pressure in the system again, with the result that the formation of the fine cells is impossible.

The form of the expanded product of the thermoplastic resin obtained by this process is not particularly limited to a sheet, a round rod, a plate, a pipe and the like.

The average diameter of the cells in the obtained expanded product of the thermoplastic resin is in the range of 0.01 to 50 μm, preferably 0.01 to 20 μm, more preferably 0.1 to 20 μm, most preferably 1 to 20 μm, and an average cell density thereof is in the range of $10^8$ to $10^{16}$ cells/cm$^3$, preferably $10^8$ to $10^{14}$ cells/cm$^3$, more preferably $10^8$ to $10^{12}$ cells/cm$^3$.

The process of the present invention is concerned with a process for preparing an expanded product of a thermoplastic resin which comprises a gas dissolving step of feeding carbon dioxide and/or nitrogen as an blowing agent to a molten resin in a first extruder 1 constituting an inlet side of a continuous plasticator, sufficiently kneading them, and then forming a mutual dissolution state of the thermoplastic resin and carbon dioxide and/or nitrogen, a cooling step of lowering a temperature of the molten resin, while maintaining a supercritical state on an outlet side of the continuous plasticator, a nuclei forming step of forming many cell nuclei by rapidly lowering a pressure, and an expansion controlling step of controlling a cell diameter, wherein when expansion is carried out in the vicinity of the outlet of a die 4 in a shear rate adjusting section 12 disposed on a resin path in the die 4, a shear rate in the range of $10^2$ to $10^4$ sec$^{-1}$ and a resin pressure necessary for a controlled pressure reduction are generated by the shear rate adjusting section 12 arranged in the die 4; a flow velocity distribution adjusting section 13 necessary to decrease a velocity distribution of the molten resin in which the expansion has been started by lowering the shear rate is arranged on the downstream side of the shear rate adjusting section 12, whereby a cell diameter and a cell density which permit the exertion of an excellent strength can optionally be controlled, and the expanded product of the thermoplastic resin having many fine cells in a uniform state and a good surface appearance can be stably extruded without uneven discharge.

Next, the present invention will be described with reference to examples, but the scope of the present invention should not be limited to these examples.

Figure 3:
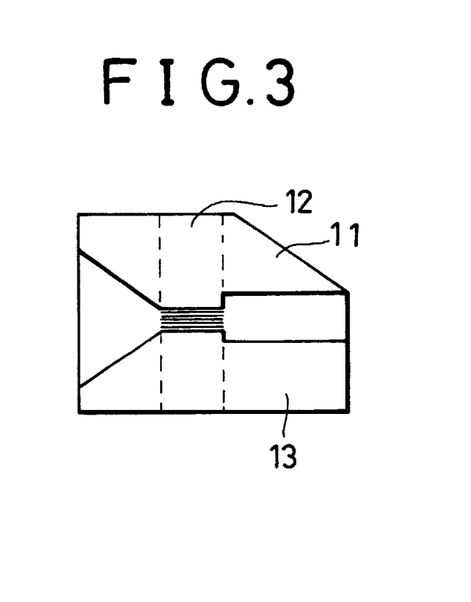
FIG. 3 is a schematic constitutional view showing another die 4 having the shear rate adjusting section 12 and flow velocity distribution adjusting section 13 on the resin flow path which can be used in the process for preparing the expanded product of the thermoplastic resin according to the present invention.
Figure 4:
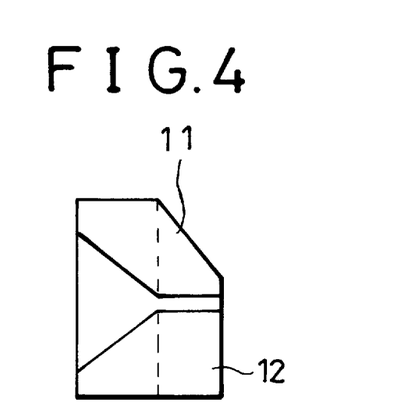
FIG. 4 is a schematic constitutional view showing a die not having a flow velocity distribution adjusting section 13 on the resin flow path which can be used in Comparative Examples 1 and 2.
Figure 5:
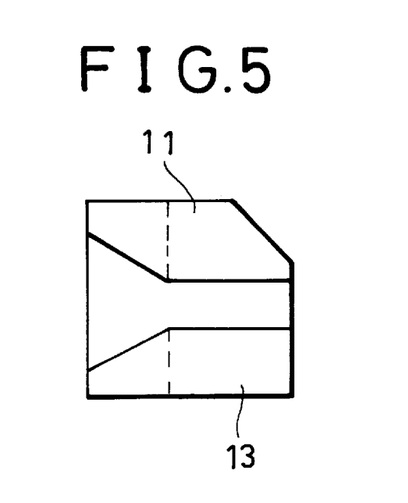
FIG. 5 is a schematic constitutional view showing a die not having the shear rate adjusting section 12 on the resin flow path which can be used in Comparative Example 5.

FIG. 1 is one embodiment of a process for preparing an expanded product of a thermoplastic resin according to the present invention. FIG. 2 is one embodiment of a die 4 having a shear rate adjusting section 12 and a flow velocity distribution adjusting section 13 on a resin flow path which can be used in the process for preparing the expanded product of the thermoplastic resin according to the present invention. FIG. 3 is another embodiment of the die 4 having the shear rate adjusting section 12 and a flow velocity distribution adjusting section 13 on the resin flow path which can be used in the process for preparing the expanded product of the thermoplastic resin according to the present invention. FIG. 4 is another embodiment of the die not having a flow velocity distribution adjusting section 13 on the resin flow path which can be used in Comparative Examples 1 and 2. FIG. 5 is another embodiment of the die not having the shear rate adjusting section 12 on the resin flow path which can be used in Comparative Example 5.

According to a process for preparing an expanded product of a thermoplastic resin of the present invention, when expansion is carried out in the vicinity of the outlet of a die 4, a resin pressure and a shear rate can be adjusted by a shear rate adjusting section 12 and a flow velocity distribution adjusting section 13, whereby a cell diameter and a cell density can optionally be controlled without changing the die 4 in compliance with the change of a raw material resin for the expanded product to be prepared and without altering an expansion ratio even in the case that the raw material is not changed. In addition, a stable extrusion can be accomplished with uneven discharge.

[EXAMPLES]

Incidentally, the evaluation of physical properties described in examples and comparative examples was made in accordance with the following procedures.

(1) Surface appearance

The surface of an expanded product was visually observed, and the expanded product having the uniform surface was represented by ○ and such an expanded product as to have a blister other than the product of ○ was represented by X.

(2) Average cell diameter

A photograph of an expanded product section taken by a scanning type electron microscope was subjected to an image treatment, and a diameter of a substantial circle of a desired cell was regarded as the average diameter of the cells.

(3) Average cell density

Expanded products of a thermoplastic resin were continuously prepared, and 3 expanded products were sampled every the expanded products per 30 minutes. Next, photographs of sections of the 3 samples were taken by a scanning type electron microscope, and then subjected to an image treatment. Afterward, the number of cells per 1 cm$^2$ was calculated from the cells in 500 $\mu$m$^2$, and then multiplied by ⅔. The thus obtained values were cell densities, and an average of the 3 cell densities was regarded as the average cell density.

(4) Uniformity of cells

In the case that a maximum cell diameter in a photograph (500 $\mu$m$^2$) of a section of an expanded product taken by a scanning type electron microscope was not more than 1.5 times as much as an average cell diameter and cell densities of the expanded product measured at 3 points were ⅔ to 1.5 times as much as an average cell density, such a expanded product was represented by ⊚, and similarly, in the case that a maximum cell diameter was not more than 2 times as much as the average cell diameter and cell densities of the expanded product measured at 3 points were ½ to 2 times as much as the average cell density, such an expanded product was represented by X.

(5) Discharge stability

Expanded products of a thermoplastic resin were continuously prepared, and a sample was taken every 30 minutes and then its thickness and width were then measured. This operation was repeated 3 times, and an average thickness and an average width were calculated.

The expanded products in which all of the measured values were in the range of ±20% of the average value were represented by ⊚, and the expanded products in which the measured values were outside the range of ±20% of the average value were represented by X.

(6) Expansion ratio

A density of an expanded product of a thermoplastic resin which was cut into 30 mm×30 mm was measured by the use of an electronic densimeter, and a ratio of the raw material to the measured density is calculated as the expansion ratio.

(7) Izod impact strength

Each of expanded sheets molded in examples and comparative examples was cut to prepare a notched Izod impact test piece of No. 2A having a width of 2 cm and a thickness of 2.5 to 4 mm in accordance with JIS K7110, and an Izod impact test was then made to measure a strength ratio to an unexpanded test piece having the same shape. With regard to each Izod impact strength of the unexpanded test pieces of polystyrene and ABS having a thickness of 4 mm which were references of the strength, the Izod impact strength of TOPOREX 555-57 (trade name, made by Mitsui Toatsu Chemicals, Inc.) was 1.40 kg-cm/cm$^2$, that of TOPOREX 525-51 (trade name, made by Mitsui Toatsu Chemicals, Inc.) was 1.23 kg-cm/cm$^2$, that of TOPOREX 575-57 (trade name, made by Mitsui Toatsu Chemicals, Inc.) was 1.46 kg-cm/cm$^2$, and that of SANTAC ET-70 (trade name, made by Mitsui Toatsu Chemicals, Inc.) was 10.2 kg-cm/cm$^2$.

Example 1

Reference will be made to an embodiment of an expansion extrusion using an expansion extrusion die 4 equipped with a flow velocity distribution adjusting section 13 having a thickness of 2.0 mm and a width of 720 mm (sectional area=1440 mm$^2$) on the downstream side of a shear rate adjusting section 12 having a thickness of 0.2 mm and a width of 600 mm (sectional area=120 mm$^2$) which was a changeable slit having a parallel groove shape (in both of the shear rate adjusting section and the flow velocity distribution adjusting section, sectional areas at various positions in each section were unchanged, and so an average sectional is equal to the sectional areas. Thus, in the case that the average sectional area is equal to the sectional areas, "the sectional area" will simply be referred to hereinafter). At this time, a sectional area ratio B/A was 12.

Pellets of a polystyrene resin (TOPOREX 555-57, made by Mitsui Toatsu Chemicals, Inc.) having a melt flow index of 2.6 g/10 minutes (measured at 200° C. under a load of 5 kg; the same shall apply hereinafter) were fed to a first extruder 1 (aperture=50 mm, L/D=30) through a hopper 6, and the pellets were then heated and molten at a cylinder temperature of 220° C. Next, carbon dioxide which was an blowing agent was pressurized up to 180 kg/cm$^2$ by means of a plunger pump 8, and 10 parts by weight of carbon dioxide was then introduced into 100 parts by weight of the completely molten resin to dissolve it in the molten resin. After the molten resin and carbon dioxide were kneaded to sufficiently dissolve carbon dioxide in the molten resin, the molten resin composition was forwarded to a second extruder 3 (aperture=65 mm, L/D=30), and its temperature was then slowly lowered. At this time, the temperature of a tip of the second extruder 3 was set to 115° C. In succession, the molten resin composition was forwarded to a die 4 set to 110° C., and a high shear was applied thereto in the shear rate adjusting section 12. A shear rate at an outlet of the shear rate adjusting section was 1.4×10$^3$ sec$^{-1}$, and a pressure of the molten resin composition at an inlet of the shear rate adjusting section 12 was 260 kg/cm$^2$ and a pressure of the molten resin composition at the outlet of the shear rate adjusting section 12 was 100 kg/cm$^2$. Afterward, at a time when the pressure of the molten resin composition was 75 kg/cm$^2$ or less, expansion was started. Next, the molten resin composition was passed through the flow velocity distribution adjusting section 13 to lower the shear rate, and it was then extruded into a sheet through a cooler 5. At this time, a discharge velocity was about 1.0 cm/sec and a discharge rate was 20 kg/hr, and the molten resin composition could stably be discharged without uneven discharge.

An obtained expanded sheet 10 of the polystyrene resin had a thickness of 4 mm, a width of 800 mm and an expansion ratio of about 6 times (density=0.17 g/cm$^3$), and a ratio C/A between a sectional area A of the shear rate adjusting section and a sectional area C of the expanded sheet was 26.7.

The evaluation results of the expanded product are shown in Table 1. It was apparent that the expanded product having an improved Izod impact strength, a good surface appearance and cells of a fine average cell diameter and a uniform average cell density could stably be prepared.

Example 2

Reference will be made to an embodiment of an expansion extrusion using an expansion extrusion die 4 equipped with a flow velocity distribution adjusting section 13 having a thickness of 1.8 mm and a width of 700 mm (sectional area=1260 $mm^2$) on the downstream side of a shear rate adjusting section 12 having a thickness of 0.4 mm and a width of 600 mm (sectional area=240 $mm^2$) which was a changeable slit having a parallel groove shape. At this time, a sectional area ratio B/A was 5.25.

Pellets of a polystyrene resin (TOPOREX 555-57, made by Mitsui Toatsu Chemicals, Inc.) having a melt flow index of 2.6 g/10 minutes were fed to a first extruder 1 (aperture= 50 mm, L/D=30) through a hopper 6, and the pellets was then heated and molten at a cylinder temperature of 220° C. Next, carbon dioxide which was an blowing agent was pressurized up to 180 kg/$cm^2$ by means of a plunger pump 8, and 10 parts by weight of carbon dioxide was then introduced into 100 parts by weight of the completely molten resin. After the molten resin and carbon dioxide were kneaded to sufficiently dissolve carbon dioxide in the molten resin, the molten resin composition was forwarded to a second extruder 3 (aperture=65 mm, L/D=30), and its temperature was then slowly lowered. At this time, the temperature of a tip of the second extruder 3 was set to 110° C. In succession, the molten resin composition was forwarded to a die 4 set to 105° C., and a high shear was applied thereto in the shear rate adjusting section 12. A shear rate at an outlet of the shear rate adjusting section was $3.5 \times 10^2$ $sec^{-1}$, and a pressure of the molten resin composition at an inlet of the shear rate adjusting section 12 was 260 kg/$cm^2$ and a pressure of the molten resin composition at the outlet of the shear rate adjusting section 12 was 100 kg/$cm^2$. Afterward, at a time when the pressure of the resin composition was 75 kg/$cm^2$ or less, expansion was started. Next, the resin composition was passed through the flow velocity distribution adjusting section 13 to lower the shear rate, and it was then extruded into a sheet through a cooler 5.

At this time, a discharge velocity was about 1.0 cm/sec and a discharge rate was 20 kg/hr, and the molten resin composition could stably be discharged without uneven discharge.

An obtained expanded sheet 10 of the polystyrene resin had a thickness of 3.5 mm, a width of 750 mm and an expansion ratio of about 5 times (density=0.20 g/$cm^3$), and a ratio C/A between a sectional area A of the flow velocity distribution adjusting section and a sectional area C of the expanded sheet was 10.9.

The evaluation results of the expanded product are shown in Table 1. It was apparent that the expanded product having an improved Izod impact strength, a good surface appearance and cells of a fine average cell diameter and a uniform average cell density could stably be prepared.

Example 3

Reference will be made to an embodiment of an expansion extrusion using an expansion extrusion die 4 equipped with a flow velocity distribution adjusting section 13 having a thickness of 1.8 mm and a width of 650 mm (sectional area=1170 $mm^2$) on the downstream side of a shear rate adjusting section 12 having a thickness of 0.7 mm and a width of 600 mm (sectional area=420 $mm^2$) which was a changeable slit having a parallel groove shape. At this time, an aperture sectional area ratio B/A was 2.8.

Pellets of a polystyrene resin (TOPOREX 555-57, made by Mitsui Toatsu Chemicals, Inc.) having a melt flow index of 2.6 g/10 minutes were fed to a first extruder 1 (aperture= 50mm, L/D=30) through a hopper 6, and the pellets was then heated and molten at a cylinder temperature of 220° C. Next, carbon dioxide which was an blowing agent was pressurized up to 180 kg/$cm^2$ by means of a plunger pump 8, and 10 parts by weight of carbon dioxide was then introduced into 100 parts by weight of the completely molten resin. After the molten resin and carbon dioxide were kneaded to sufficiently dissolve carbon dioxide in the molten resin, the molten resin composition was forwarded to a second extruder 3 (aperture=65 mm, L/D=30), and its temperature was then slowly lowered. At this time, the temperature of a tip of the second extruder 3 was set to 105° C. In succession, the molten resin composition was forwarded to a die 4 set to 100° C., and a high shear was applied thereto in the shear rate adjusting section 12. A shear rate at an outlet of the shear rate adjusting section was $1.1 \times 10^2$ $sec^{-1}$, and a pressure of the molten resin composition at an inlet of the shear rate adjusting section 12 was 260 kg/$cm^2$ and a pressure of the molten resin composition at the outlet of the shear rate adjusting section 12 was 100 kg/$cm^2$. Afterward, at a time when the pressure of the resin composition was 75 kg/$cm^2$ or less, expansion was started. Next, the resin composition was passed through the flow velocity distribution adjusting section 13 to lower the shear rate, and it was then extruded into a sheet through a cooler 5. At this time, a discharge velocity was about 1.0 cm/sec and a discharge rate was 20 kg/hr, and the molten resin composition could stably be discharged without uneven discharge.

An obtained expanded sheet 10 of the polystyrene resin had a thickness of 2.5 mm, a width of 700 mm and an expansion ratio of about 3 times (density=0.33 g/$cm^3$), and a ratio C/A between a sectional area A of the shear rate adjusting sections and a sectional area C of the expanded sheet was 4.2.

The evaluation results of the expanded product are shown in Table 1. It was apparent that the expanded product having an improved Izod impact strength, a good surface appearance and cells of a fine average cell diameter and a uniform average cell density could stably be prepared.

Example 4

Reference will be made to an embodiment of an expansion extrusion using an expansion extrusion die 4 equipped with a flow velocity distribution adjusting section 13 having a thickness of 2.0 mm and a width of 720 mm (sectional area=1440 $mm^2$) on the downstream side of a shear rate adjusting section 12 having a thickness of 0.2 mm and a width of 600 mm (sectional area=120 $mm^2$) which was a changeable slit having a parallel groove shape. At this time, a sectional area ratio B/A was 12.

Pellets of an ABS resin (SANTAC ET-70, made by Mitsui Toatsu Chemicals, Inc.) having a melt flow index of 0.8 g/10 minutes were fed to a first extruder 1 (aperture=50 mm, L/D=30) through a hopper 6, and the pellets was then heated and molten at a cylinder temperature of 220° C. Next, carbon dioxide which was an blowing agent was pressurized up to 180 kg/cm² by means of a plunger pump 8, and 10 parts by weight of carbon dioxide was then introduced into 100 parts by weight of the completely molten resin. After the molten resin and carbon dioxide were kneaded to sufficiently dissolve carbon dioxide in the molten resin, the molten resin composition was forwarded to a second extruder 3 (aperture=65 mm, L/D=30), and its temperature was then slowly lowered. At this time, the temperature of a tip of the second extruder 3 was set to 115° C. In succession, the molten resin composition was forwarded to a die 4 set to 110° C., and a high shear was applied thereto in the shear rate adjusting section 12. A shear rate at an outlet of the shear rate adjusting section was $1.4 \times 10^3$ sec$^{-1}$, and a pressure of the molten resin composition at an inlet of the shear rate adjusting section 12 was 280 kg/cm² and a pressure of the molten resin composition at the outlet of the shear rate adjusting section 12 was 100 kg/cm². Afterward, at a time when the pressure of the resin composition was 75 kg/cm² or less, expansion was started. Next, the resin composition was passed through the flow velocity distribution adjusting section 13 to lower the shear rate, and it was then extruded into a sheet through a cooler 5. At this time, a discharge velocity was about 1.0 cm/sec and a discharge rate was 20 kg/hr, and the molten resin composition could stably be discharged without uneven discharge.

An obtained expanded sheet 10 of the ABS resin had a thickness of 4 mm, a width of 800 mm and an expansion ratio of about 6 times (density=0.17 g/cm³), and a ratio C/A between a sectional area A of the shear rate adjusting section and a sectional area C of the expanded sheet was 26.7.

The evaluation results of the expanded product are shown in Table 1. It was apparent that the expanded product having an improved Izod impact strength, a good surface appearance and cells of a fine average cell diameter and a uniform average cell density could stably be prepared.

Comparative Example 1

Expansion extrusion was conducted in accordance with the same procedure as in Example 1 except that a flow velocity distribution adjusting section 13 was omitted. Next, a high shear was applied to a molten resin composition in a shear rate adjusting section 12 in a die 4 set to 110° C., whereby expansion was started. At this time, a shear rate was $1.4 \times 10^3$ sec$^{-1}$, and a pressure of the molten resin composition at an inlet of the shear rate adjusting section 12 was 160 kg/cm². In succession, the molten resin composition was extruded into a sheet through a cooler 5. At this time, a discharge velocity was in the range of about 0.7 to 3.5 cm/sec and the unevenness of discharge occurred for a short period of time. A discharge rate was 20 kg/hr. An expansion ratio of an obtained expanded sheet 10 of a polystyrene resin was about 6 times (density=0.17 g/cm³).

The evaluation results of the expanded product are shown in Table 1. Owing to the unevenness of discharge, the expanded sheet 10 was uneven and had a thickness of 2 to 5 mm and a width of 770 to 820 mm. With regard to the appearance of the expanded sheet, it was white and glossy, but wrinkles due to the unevenness of discharge occurred. In consequence, the obtained expanded sheet 10 had a poor surface state. Since the thickness of the obtained sheet was uneven, Izod impact strength was not evaluated.

Comparative Example 2

Expansion extrusion was conducted in accordance with the same procedure as in Example 3 except that a flow velocity distribution adjusting section 13 was omitted. Next, a high shear was applied to a molten resin composition in a shear rate adjusting section 12 in a die 4 set to 100° C., whereby expansion was started. A shear rate at an outlet of the shear rate adjusting section was $1.1 \times 10^2$ sec$^{-1}$, and a pressure of the molten resin composition at an inlet of the shear rate adjusting section 12 was 160 kg/cm². In succession, the molten resin composition was extruded into a sheet through a cooler 5. At this time, a discharge velocity was in the range of about 0.8 to 2.4 cm/sec and the unevenness of discharge occurred for a short period of time. A discharge rate was 20 kg/hr. An expansion ratio of an obtained expanded sheet 10 of a polystyrene resin was about 3 times (density=0.33 g/cm³).

The evaluation results of the expanded product are shown in Table 1. Owing to the unevenness of discharge, the expanded sheet 10 was uneven and had a thickness of 2 to 5 mm and a width of 680 to 710 mm. With regard to the appearance of the expanded sheet, it was white and glossy, but wrinkles due to the unevenness of discharge occurred. In consequence, the obtained expanded sheet 10 had a poor surface state. Since the thickness of the obtained sheet was uneven, Izod impact strength was not evaluated.

Comparative Example 3

Expansion extrusion was conducted in accordance with the same procedure as in Example 1 except that a flow velocity distribution adjusting section 13 having a thickness of 3.5 mm, a width of 750 mm and a sectional area B of 2625 mm² was used. At this time, a sectional area ratio B/A was 22. Next, a high shear was applied to a molten resin composition in a shear rate adjusting section 12 in a die 4 set to 110° C., whereby expansion was started. A shear rate at an outlet of the shear rate adjusting section was $1.4 \times 10^3$ sec$^{-1}$, and a pressure of the molten resin composition at an inlet of the shear rate adjusting section 12 was 200 kg/cm² and a pressure of the molten resin composition at the outlet of the shear rate adjusting section 12 was 40 kg/cm². Next, the resin composition was passed through the flow velocity distribution adjusting section 13 to lower the shear rate, and it was then extruded into a sheet through a cooler 5. At this time, a discharge velocity was in the range of 0.8 to 2.5 cm/sec, and the unevenness of discharge occurred for a short period of time. A discharge rate was 20 kg/hr. An expansion ratio of an obtained expanded sheet 10 of a polystyrene resin was about 6 times (density=0.17 g/cm³).

The evaluation results of the expanded product are shown in Table 1. Owing to the unevenness of discharge, the expanded sheet 10 was uneven and had a thickness of 2 to 4 mm and a width of 790 to 810 mm. With regard to the appearance of the expanded sheet, it was white and glossy, but wrinkles due to the unevenness of discharge occurred. In consequence, the obtained expanded sheet 10 had a poor surface state. Since the thickness of the obtained sheet was uneven, Izod impact strength was not evaluated.

Comparative Example 4

Expansion extrusion was conducted in accordance with the same procedure as in Example 3 except that a flow velocity distribution adjusting section 13 having a thickness of 0.8 mm, a width of 620 mm and a sectional area B of 500 mm² was used. At this time, a sectional area ratio B/A was 1.8. Next, a high shear was applied to a molten resin composition in a shear rate adjusting section 12 in a die 4 set to 100° C., whereby expansion was started. A shear rate at an outlet of the shear rate adjusting section was $1.4 \times 10^3$ sec$^{-1}$, and a pressure of the molten resin composition at an inlet of the shear rate adjusting section 12 was 300 kg/cm$^2$ and a pressure of the molten resin composition at the outlet of the shear rate adjusting section 12 was 140 kg/cm$^2$. Next, the resin composition was passed through the flow velocity distribution adjusting section 13 to lower the shear rate, and it was then extruded into a sheet through a cooler 5. At this time, a discharge velocity was in the range of 0.8 to 4.0 cm/sec, and the unevenness of discharge occurred for a short period of time. A discharge rate was 20 kg/hr. An expansion ratio of an obtained expanded sheet 10 of a polystyrene resin was about 3 times (density=0.33 g/cm$^3$).

The evaluation results of the expanded product are shown in Table 1. Owing to the unevenness of discharge, the expanded sheet 10 was uneven and had a thickness of 1 to 3 mm and a width of 690 to 700 mm. The appearance of the expanded sheet was white and glossy, but wrinkles due to the unevenness of discharge occurred. In addition, a shark skin due to melt fracture was formed, and so the obtained expanded sheet 10 had a poor surface state. Since the thickness of the obtained sheet was uneven, Izod impact strength was not evaluated.

Comparative Example 5

An expanded product was obtained in accordance with the same procedure as in Example 1 except that a die not having a shear rate adjusting section 12 was used.

The evaluation results of the expanded product are shown in Table 1. Discharge was stable and a surface appearance was also good, but cells were uneven and large and strength was also poor.

Examples 5 to 9

Each expanded sheet 10 of a polystyrene resin having a thickness of 4 mm was obtained by the same procedure as in Example 1 except that talc and/or zinc stearate was added to the polystyrene resin or simultaneously a ratio of carbon dioxide was changed. The evaluation results of the expanded products are shown in Table 2. It was apparent that the expanded products having an improved Izod impact strength, a good surface appearance and cells of a fine average cell diameter and a uniform average cell density could stably be prepared.

Example 10

An expanded sheet 10 of a polystyrene resin having a thickness of 4 mm was obtained by the same procedure as in Example 1 except that a shear rate adjusting section 12 having 5 parallel groove layers each having a thickness of 0.2 mm, a width of 600 mm and a length of 3 mm was used.

The evaluation results of the expanded product are shown in Table 2. It was apparent that the expanded product having an improved Izod impact strength, a good surface appearance and cells of a fine average cell diameter and a uniform average cell density could stably be prepared.

Example 11

An expanded product was obtained by the same procedure as in Example 10 except that talc and zinc stearate were added.

The evaluation results of the expanded product are shown in Table 2. It was apparent that the expanded product having an improved Izod impact strength, a good surface appearance and cells of a fine average cell diameter and a uniform average cell density could stably be prepared.

Comparative Examples 6 and 7

Each expanded product was obtained by the same procedure as in Example 1 except that a ratio of a polystyrene resin, zinc stearate and carbon dioxide shown in Table 2 was used.

The evaluation results of the expanded products are shown in Table 2. Inconveniently, formed cells did not have a fine average cell diameter, and the number of the cells was small. In consequence, any expanded products which were intended by the present invention could not be prepared.

Example 12

An expanded product was obtained by the same procedure as in Example 1 except that 1 part by weight of perfluoropropyl montanate ester was dry-blended with 100 parts by weight of pellets of a polystyrene resin (TOPOREX 555-57, made by Mitsui Toatsu Chemicals, Inc.) having a melt flow index of 2.6 g/10 minutes at 200° C. under a load of 5 kg.

At this time, a discharge rate was set to 30 kg/hr, but a surface appearance failure by corrugation, melt fracture or the like did not occur. Thus, the products having the good appearance could continuously be prepared.

The evaluation results of the expanded product are shown in Table 3. It was apparent that the expanded product having an improved Izod impact strength, a good surface appearance and cells of a fine average cell diameter and a uniform average cell density could stably be prepared.

Examples 13 to 17

Each expanded product was obtained by the same procedure as in Example 12 except that a ratio of a polystyrene resin, perfluoropropyl montanate ester and carbon dioxide shown in Table 3 was used. The evaluation results of the expanded products are shown in Table 3. It was apparent that the expanded products having an improved Izod impact strength, a good surface appearance and cells of a fine average cell diameter and a uniform average cell density could stably be prepared.

Example 18

An expanded product was obtained by the same procedure as in Example 12 except that a polystyrene resin (TOPOREX 525-51, made by Mitsui Toatsu Chemicals, Inc.) having a melt flow index of 10 g/10 minutes was used as a polystyrene resin.

The evaluation results of the expanded product are shown in Table 3. It was apparent that the expanded product having an improved Izod impact strength, a good surface appearance and cells of a fine average cell diameter and a uniform average cell density could stably be prepared.

Example 19

An expanded product was obtained by the same procedure as in Example 12 except that a polystyrene resin (TOPOREX 575-57, made by Mitsui Toatsu Chemicals, Inc.) having a melt flow index of 1.8 g/10 minutes was used as a polystyrene resin.

The evaluation results of the expanded product are shown in Table 3. It was apparent that the expanded product having an improved Izod impact strength, a good surface appearance and cells of a fine average cell diameter and a uniform average cell density could stably be prepared.

Comparative Examples 8 and 9

Each expanded product was obtained by the same procedure as in Example 12 except that a ratio of carbon dioxide shown in Table 3 was used.

The evaluation results of the expanded products are shown in Table 3. Inconveniently, with regard to the expanded products, a surface appearance was defective, cells did not have a fine average cell diameter and the number of the cells was small. In consequence, any expanded products which were intended by the present invention could not be prepared.

Example 20

An expanded product was obtained by the same procedure as in Example 1 except that 1 part by weight of polydimethylsiloxane was dry-blended with 100 parts by weight of pellets of a polystyrene resin (TOPOREX 555-57, made by Mitsui Toatsu Chemicals, Inc.) having a melt flow index of 2.6 g/10 minutes.

At this time, a discharge rate was set to 30 kg/hr, but a surface appearance failure by corrugation, melt fracture or the like did not occur. Thus, the products having the good appearance could continuously be prepared.

The evaluation results of the expanded product are shown in Table 4. It was apparent that the expanded product having an improved Izod impact strength, a good surface appearance and cells of a fine average cell diameter and a uniform average cell density could stably be prepared.

Examples 21 to 25

Each expanded product was obtained by the same procedure as in Example 20 except that a ratio of raw materials such as a polystyrene resin, polydimethylsiloxane, talc and carbon dioxide shown in Table 4 was used.

The evaluation results of the expanded products are shown in Table 4. It was apparent that the expanded products having an improved Izod impact strength, a good surface appearance and cells of a fine average cell diameter and a uniform average cell density could stably be prepared.

Example 26

An expanded product was obtained by the same procedure as in Example 20 except that a polystyrene resin (TOPOREX 525-51, made by Mitsui Toatsu Chemicals, Inc.) having a melt flow index of 10 g/10 minutes was used as a polystyrene resin.

The evaluation results of the expanded product are shown in Table 4. It was apparent that the expanded product having an improved Izod impact strength, a good surface appearance and cells of a fine average cell diameter and a uniform average cell density could stably be prepared.

Example 27

An expanded product was obtained by the same procedure as in Example 20 except that a polystyrene resin (TOPOREX 575-57, made by Mitsui Toatsu Chemicals, Inc.) having a melt flow index of 1.8 g/10 minutes was used as a polystyrene resin.

The evaluation results of the expanded product are shown in Table 4. It was apparent that the expanded product having an improved Izod impact strength, a good surface appearance and cells of a fine average cell diameter and a uniform average cell density could stably be prepared.

Comparative Examples 9 and 10

Each expanded product was obtained by the same procedure as in Example 20 except that a ratio of carbon dioxide shown in Table 4 was used.

The evaluation results of the expanded products are shown in Table 4. Inconveniently, with regard to the expanded products, a surface appearance was defective, cells did not have a fine average cell diameter and the number of the cells was small. In consequence, any expanded products which were intended by the present invention could not be prepared.

TABLE 1

| | Example | | | | Comparative example | | | | |
|---|---|---|---|---|---|---|---|---|---|
| | 1 | 2 | 3 | 4 | 1 | 2 | 3 | 4 | 5 |
| Polystyrene resin (pts. wt.) | 100 | 100 | 100 | — | 100 | 100 | 100 | 100 | 100 |
| ABS resin (pts. wt.) | — | — | — | 100 | — | — | — | — | — |
| Carbon dioxide (pts. wt.) | 10 | 10 | 10 | 10 | 10 | 10 | 10 | 10 | 10 |
| Resin temperature (°C.) | 110 | 105 | 100 | 110 | 110 | 100 | 110 | 100 | 110 |
| Shear rate adjusting section area A (mm$^2$) | 120 | 240 | 420 | 120 | 120 | 420 | 120 | 420 | — |
| Flow velocity distribution adjusting section area B (mm$^2$) | 1440 | 1260 | 1170 | 1440 | — | — | 2625 | 550 | 1440 |
| B/A | 12 | 5.25 | 2.8 | 12 | — | — | 22 | 1.18 | — |
| Shear rate adjusting section thickness (mm) | 0.2 | 0.4 | 0.7 | 0.2 | 0.2 | 0.7 | 0.2 | 0.7 | — |
| Shear rate adjusting section width (mm) | 600 | 600 | 600 | 600 | 600 | 600 | 600 | 600 | — |
| Shear rate adjusting section length (mm) | 3 | 3 | 3 | 3 | 3 | 3 | 3 | 3 | — |
| Shear rate (sec$^{-1}$) | $1.4 \times 10^3$ | $3.5 \times 10^2$ | $1.1 \times 10^2$ | $1.4 \times 10^2$ | $1.4 \times 10^3$ | $1.1 \times 10^2$ | $1.4 \times 10^3$ | $1.4 \times 10^3$ | — |
| Shear rate adjusting section inlet pressure (kg/cm$^2$) | 260 | 260 | 260 | 280 | 160 | 160 | 200 | 300 | 40$^{a)}$ |
| Shear rate adjusting section outlet pressure (kg/cm$^2$) | 100 | 100 | 100 | 100 | 0 | 0 | 40 | 140 | 0$^{b)}$ |
| Flow velocity distribution adjusting section thickness (mm) | 2.0 | 1.8 | 1.8 | 2.0 | — | — | 3.5 | 0.6 | 2.0 |
| Flow velocity distribution adjusting section width (mm) | 720 | 700 | 650 | 720 | — | — | 750 | 620 | 720 |
| Flow velocity distribution adjusting section length (mm) | 10 | 10 | 10 | 10 | — | — | 10 | 10 | 10 |
| Discharge velocity (cm/sec) | 1.0 | 1.0 | 1.0 | 1.0 | 0.7–3.5 | 0.8–2.4 | 0.8–2.5 | 0.8–4.0 | 1.0 |
| Discharge rate (kg/hr) | 20 | 20 | 20 | 20 | 20 | 20 | 20 | 20 | 20 |
| Thickness of expanded product (mm) | 4.0 | 3.5 | 2.5 | 4.0 | 2–5 | 2–5 | 2–4 | 1–3 | 4.0 |
| Surface appearance | ○ | ○ | ○ | ○ | x | x | x | x | ○ |
| Average cell diameter (μm) | 5 | 3 | 1 | 2 | 8 | 5 | 8 | 5 | 100–500 |
| Average cell density (cells/cm$^3$) | $1.0 \times 10^{10}$ | $6.0 \times 10^{11}$ | $1.0 \times 10^{12}$ | $2.0 \times 10^{11}$ | $3.0 \times 10^9$ | $1.0 \times 10^{10}$ | $3.0 \times 10^9$ | $1.0 \times 10^{10}$ | $3.0 \times 10^3$ |
| Uniformity of cells | ◎ | ◎ | ◎ | ◎ | ◎ | ◎ | ◎ | ◎ | x |
| Discharge stability | ◎ | ◎ | ◎ | ◎ | x | x | x | x | ◎ |

TABLE 1-continued

|  | Example | | | | Comparative example | | | | |
| --- | --- | --- | --- | --- | --- | --- | --- | --- | --- |
|  | 1 | 2 | 3 | 4 | 1 | 2 | 3 | 4 | 5 |
| Expansion ratio | 6 | 5 | 3 | 6 | 6 | 3 | 6 | 3 | 6 |
| Izod impact strength (kg-cm/cm$^2$) | 1.82 | 1.78 | 1.70 | 13.0 | — | — | — | — | 1.05 |
| Strength improvement ratio (%) | 30 | 27 | 21 | 27 | — | — | — | — | −25 | a)Flow velocity distribution adjusting section inlet pressure
b)Flow velocity distribution adjusting section outlet pressure

TABLE 2

|  | Example | | | | | | | Comparative example | |
| --- | --- | --- | --- | --- | --- | --- | --- | --- | --- |
|  | 5 | 6 | 7 | 8 | 9 | 10 | 11 | 6 | 7 |
| Polystyrene resin (pts. wt.) | 100 | 100 | 100 | 100 | 100 | 100 | 100 | 100 | 100 |
| Carbon dioxide (pts. wt.) | 10 | 10 | 10 | 3 | 25 | 10 | 10 | 0.05 | 40 |
| Zinc stearate (pts. wt.) | 0.5 | 0.5 | 0 | 0.5 | 0.5 | 0 | 0.5 | 1 | 1 |
| Talc (pts. wt.) | 2 | 0 | 2 | 2 | 2 | 0 | 2 | 0 | 0 |
| Resin temperature (°C.) | 110 | 110 | 110 | 110 | 110 | 110 | 110 | 110 | 110 |
| Shear rate adjusting section area A (mm$^2$) | 120 | 120 | 120 | 120 | 120 | 120 | 120 | 120 | 120 |
| Flow velocity distribution adjusting section area B (mm$^2$) | 1440 | 1440 | 1440 | 1440 | 1440 | 1440 | 1440 | 1440 | 1440 |
| B/A | 12 | 12 | 12 | 12 | 12 | 12 | 12 | 12 | 12 |
| Shear rate adjusting section thickness (mm) | 0.2 | 0.2 | 0.2 | 0.2 | 0.2 | 0.2 × 5 | 0.2 × 5 | 0.2 | 0.2 |
| Shear rate adjusting section width (mm) | 600 | 600 | 600 | 600 | 600 | 600 | 600 | 600 | 600 |
| Shear rate adjusting section length (mm) | 3 | 3 | 3 | 3 | 3 | 3 | 3 | 3 | 3 |
| Shear rate (sec$^{-1}$) | 1.4 × 10$^3$ | 1.4 × 10$^3$ | 1.4 × 10$^3$ | 1.4 × 10$^3$ | 1.4 × 10$^3$ | 1.4 × 10$^3$ | 1.4 × 10$^3$ | 1.4 × 10$^3$ | 1.4 × 10$^3$ |
| Shear rate adjusting section inlet pressure (kg/cm$^2$) | 260 | 260 | 260 | 300 | 230 | 240 | 240 | 420 | 200 |
| Shear rate adjusting section outlet pressure (kg/cm$^2$) | 100 | 100 | 100 | 100 | 100 | 100 | 100 | 140 | 50 |
| Flow velocity distribution adjusting section thickness (mm) | 2.0 | 2.0 | 2.0 | 2.0 | 2.0 | 2.0 | 2.0 | 2.0 | 2.0 |
| Flow velocity distribution adjusting section width (mm) | 720 | 720 | 720 | 720 | 720 | 720 | 720 | 720 | 720 |
| Flow velocity distribution adjusting section length (mm) | 10 | 10 | 10 | 10 | 10 | 10 | 10 | 10 | 10 |
| Discharge velocity (cm/sec) | 1.0 | 1.0 | 1.0 | 1.0 | 1.0 | 1.0 | 1.0 | 1.0 | 1.0 |
| Discharge rate (kg/hr) | 20 | 20 | 20 | 20 | 20 | 20 | 20 | 20 | 20 |
| Thickness of expanded product (mm) | 4.0 | 4.0 | 4.0 | 4.0 | 4.0 | 4.0 | 4.0 | 2–2.5 | 5–10 |
| Surface appearance | ○ | ○ | ○ | ○ | ○ | ○ | ○ | ○ | x |
| Average cell diameter (μm) | 8 | 10 | 8 | 30 | 6 | 8 | 7 | 100 | 10 |
| Average cell density (cells/cm$^3$) | 1.0 × 10$^{11}$ | 8.0 × 10$^{10}$ | 1.0 × 10$^{11}$ | 2.0 × 10$^9$ | 2.0 × 10$^{11}$ | 1.0 × 10$^{11}$ | 1.0 × 10$^{11}$ | 3.0 × 10$^3$ | 9.0 × 10$^{11}$ |
| Uniformity of cells | ⊚ | ⊚ | ⊚ | ⊚ | ⊚ | ⊚ | ⊚ | ⊚ | x |
| Discharge stability | ⊚ | ⊚ | ⊚ | ⊚ | ⊚ | ⊚ | ⊚ | ⊚ | x |
| Expansion ratio | 6 | 6 | 6 | 4 | 10 | 6 | 6 | 1.2 | 25 |
| Izod impact strength (kg-cm/cm$^2$) | 2.00 | 1.90 | 1.92 | 1.68 | 2.10 | 1.90 | 2.05 | — | — |
| Strength improvement ratio (%) | 43 | 36 | 37 | 20 | 50 | 36 | 46 | — | — |

TABLE 3

|  | Example | | | | | | | | Comparative example | |
| --- | --- | --- | --- | --- | --- | --- | --- | --- | --- | --- |
|  | 12 | 13 | 14 | 15 | 16 | 17 | 18 | 19 | 8 | 9 |
| Polystyrene resin (pts. wt.) | 100 | 100 | 100 | 100 | 100 | 100 | 100 | 100 | 100 | 100 |
| Carbon dioxide (pts. wt.) | 10 | 10 | 3 | 25 | 10 | 10 | 10 | 10 | 0.05 | 40 |
| Perfluoropropyl montanate ester (pts. wt.) | 1 | 1 | 1 | 1 | 0.5 | 5 | 1 | 1 | 1 | 1 |
| Talc (pts. wt.) | 0 | 2 | 0 | 0 | 0 | 0 | 0 | 0 | 0 | 0 |
| Resin temperature (°C.) | 110 | 110 | 110 | 110 | 110 | 110 | 110 | 110 | 110 | 110 |
| Shear rate adjusting section area A (mm$^2$) | 120 | 120 | 120 | 120 | 120 | 120 | 120 | 120 | 120 | 120 |
| Flow velocity distribution adjusting section area B (mm$^2$) | 1440 | 1440 | 1440 | 1440 | 1440 | 1440 | 1440 | 1440 | 1440 | 1440 |
| B/A | 12 | 12 | 12 | 12 | 12 | 12 | 12 | 12 | 12 | 12 |
| Shear rate adjusting section thickness (mm) | 0.2 | 0.2 | 0.2 | 0.2 | 0.2 | 0.2 | 0.2 | 0.2 | 0.2 | 0.2 |
| Shear rate adjusting section width (mm) | 600 | 600 | 600 | 600 | 600 | 600 | 600 | 600 | 600 | 600 |

TABLE 3-continued

|  | Example |  |  |  |  |  |  |  | Comparative example |  |
|---|---|---|---|---|---|---|---|---|---|---|
|  | 12 | 13 | 14 | 15 | 16 | 17 | 18 | 19 | 8 | 9 |
| Shear rate adjusting section length (mm) | 3 | 3 | 3 | 3 | 3 | 3 | 3 | 3 | 3 | 3 |
| Shear rate (sec$^{-1}$) | $2.1 \times 10^3$ | $2.1 \times 10^3$ | $2.1 \times 10^3$ | $2.1 \times 10^3$ | $2.1 \times 10^3$ | $2.1 \times 10^3$ | $2.1 \times 10^3$ | $1.4 \times 10^3$ | $2.1 \times 10^3$ | $2.1 \times 10^3$ |
| Shear rate adjusting section inlet pressure (kg/cm$^2$) | 320 | 320 | 360 | 240 | 320 | 320 | 320 | 320 | 420 | 200 |
| Shear rate adjusting section outlet pressure (kg/cm$^2$) | 100 | 100 | 100 | 100 | 100 | 100 | 100 | 100 | 140 | 50 |
| Flow velocity distribution adjusting section thickness (mm) | 2.0 | 2.0 | 2.0 | 2.0 | 2.0 | 2.0 | 2.0 | 2.0 | 2.0 | 2.0 |
| Flow velocity distribution adjusting section width (mm) | 720 | 720 | 720 | 720 | 720 | 720 | 720 | 720 | 720 | 720 |
| Flow velocity distribution adjusting section length (mm) | 10 | 10 | 10 | 10 | 10 | 10 | 10 | 10 | 10 | 10 |
| Discharge velocity (cm/sec) | 1.5 | 1.5 | 1.5 | 1.5 | 1.5 | 1.5 | 1.5 | 1.5 | 1.5 | 1.5 |
| Discharge rate (kg/hr) | 30 | 30 | 30 | 30 | 30 | 30 | 30 | 30 | 30 | 30 |
| Thickness of expanded product (mm) | 4.0 | 4.0 | 4.0 | 4.0 | 4.0 | 4.0 | 4.0 | 4.0 | 2–2.5 | 5–10 |
| Surface appearance | ○ | ○ | ○ | ○ | ○ | ○ | ○ | ○ | ○ | x |
| Average cell diameter (μm) | 10 | 8 | 20 | 6 | 10 | 12 | 13 | 9 | 100 | 10 |
| Average cell density (cells/cm$^3$) | $4.0 \times 10^{10}$ | $7.0 \times 10^{10}$ | $1.0 \times 10^{10}$ | $3.0 \times 10^{11}$ | $6.0 \times 10^{11}$ | $1.0 \times 10^{10}$ | $6.0 \times 10^{10}$ | $7.0 \times 10^{10}$ | $3.0 \times 10^3$ | $9.0 \times 10^{11}$ |
| Uniformity of cells | ⊚ | ⊚ | ⊚ | ⊚ | ⊚ | ⊚ | ⊚ | ⊚ | ⊚ | x |
| Discharge stability | ⊚ | ⊚ | ⊚ | ⊚ | ⊚ | ⊚ | ⊚ | ⊚ | ⊚ | x |
| Expansion ratio | 6 | 6 | 4 | 10 | 6 | 6 | 6 | 6 | 1.2 | 25 |
| Izod impact strength (kg-cm/cm$^2$) | 2.00 | 2.10 | 1.70 | 2.05 | 2.00 | 1.96 | 1.75 | 2.16 | — | — |
| Strength improvement ratio (%) | 43 | 50 | 21 | 46 | 43 | 40 | 42 | 48 | — | — |

TABLE 4

|  | Example |  |  |  |  |  |  |  | Comparative example |  |
|---|---|---|---|---|---|---|---|---|---|---|
|  | 20 | 21 | 22 | 23 | 24 | 25 | 26 | 27 | 10 | 11 |
| Polystyrene resin (pts. wt.) | 100 | 100 | 100 | 100 | 100 | 100 | 100 | 100 | 100 | 100 |
| Carbon dioxide (pts. wt.) | 10 | 10 | 3 | 25 | 10 | 10 | 10 | 10 | 0.05 | 40 |
| Polydimethylsiloxane (pts. wt.) | 1 | 1 | 1 | 1 | 0.5 | 5 | 1 | 1 | 1 | 1 |
| Talc (pts. wt.) | 0 | 2 | 0 | 0 | 0 | 0 | 0 | 0 | 0 | 0 |
| Resin temperature (°C.) | 110 | 110 | 110 | 110 | 110 | 110 | 110 | 110 | 110 | 110 |
| Shear rate adjusting section area A (mm$^2$) | 120 | 120 | 120 | 120 | 120 | 120 | 120 | 120 | 120 | 120 |
| Flow velocity distribution adjusting section area B (mm$^2$) | 1440 | 1440 | 1440 | 1440 | 1440 | 1440 | 1440 | 1440 | 1440 | 1440 |
| B/A | 12 | 12 | 12 | 12 | 12 | 12 | 12 | 12 | 12 | 12 |
| Shear rate adjusting section thickness (mm) | 0.2 | 0.2 | 0.2 | 0.2 | 0.2 | 0.2 | 0.2 | 0.2 | 0.2 | 0.2 |
| Shear rate adjusting section width (mm) | 600 | 600 | 600 | 600 | 600 | 600 | 600 | 600 | 600 | 600 |
| Shear rate adjusting section length (mm) | 3 | 3 | 3 | 3 | 3 | 3 | 3 | 3 | 3 | 3 |
| Shear rate (sec$^{-1}$) | $2.1 \times 10^3$ | $2.1 \times 10^3$ | $2.1 \times 10^3$ | $2.1 \times 10^3$ | $2.1 \times 10^3$ | $2.1 \times 10^3$ | $2.1 \times 10^3$ | $2.1 \times 10^3$ | $2.1 \times 10^3$ | $2.1 \times 10^3$ |
| Shear rate adjusting section inlet pressure (kg/cm$^2$) | 320 | 320 | 360 | 240 | 320 | 320 | 320 | 320 | 420 | 200 |
| Shear rate adjusting section outlet pressure (kg/cm$^2$) | 100 | 100 | 100 | 100 | 100 | 100 | 100 | 100 | 140 | 50 |
| Flow velocity distribution adjusting section thickness (mm) | 2.0 | 2.0 | 2.0 | 2.0 | 2.0 | 2.0 | 2.0 | 2.0 | 2.0 | 2.0 |
| Flow velocity distribution adjusting section width (mm) | 720 | 720 | 720 | 720 | 720 | 720 | 720 | 720 | 720 | 720 |
| Flow velocity distribution adjusting section length (mm) | 10 | 10 | 10 | 10 | 10 | 10 | 10 | 10 | 10 | 10 |
| Discharge velocity (cm/sec) | 1.5 | 1.5 | 1.5 | 1.5 | 1.5 | 1.5 | 1.5 | 1.5 | 1.5 | 1.5 |
| Discharge rate (kg/hr) | 30 | 30 | 30 | 30 | 30 | 30 | 30 | 30 | 30 | 30 |

TABLE 4-continued

|  | Example | | | | | | | | Comparative example | |
| --- | --- | --- | --- | --- | --- | --- | --- | --- | --- | --- |
|  | 20 | 21 | 22 | 23 | 24 | 25 | 26 | 27 | 10 | 11 |
| Thickness of expanded product (mm) | 4.0 | 4.0 | 4.0 | 4.0 | 4.0 | 4.0 | 4.0 | 4.0 | 2–2.5 | 5–10 |
| Surface appearance | ○ | ○ | ○ | ○ | ○ | ○ | ○ | ○ | ○ | x |
| Average cell diameter ($\mu$m) | 12 | 11 | 18 | 7 | 10 | 12 | 12 | 5 | 100 | 10 |
| Average cell density (cells/cm$^3$) | $4.0 \times 10^{10}$ | $6.0 \times 10^{10}$ | $1.0 \times 10^{10}$ | $1.0 \times 10^{11}$ | $6.0 \times 10^{11}$ | $1.0 \times 10^{10}$ | $5.0 \times 10^{10}$ | $7.0 \times 10^{11}$ | $2.0 \times 10^{3}$ | $8.0 \times 10^{10}$ |
| Uniformity of cells | ⊚ | ⊚ | ⊚ | ⊚ | ⊚ | ⊚ | ⊚ | ⊚ | ⊚ | x |
| Discharge stability | ⊚ | ⊚ | ⊚ | ⊚ | ⊚ | ⊚ | ⊚ | ⊚ | ⊚ | x |
| Expansion ratio | 6 | 6 | 4 | 10 | 6 | 6 | 6 | 6 | 1.2 | 25 |
| Izod impact strength (kg-cm/cm$^2$) | 2.00 | 2.10 | 1.70 | 2.05 | 2.00 | 1.96 | 1.73 | 2.13 | — | — |
| Strength improvement ratio (%) | 43 | 50 | 21 | 46 | 43 | 40 | 41 | 46 | — | — |

What is claimed is:

1. A process for preparing an expanded product of a thermoplastic resin by extrusion molding which comprises:

(I) a gas dissolving step of the thermoplastic resin at 100° to 450° C. in a continuous plasticator having a line for feeding an blowing agent, and adding supercritical carbon dioxide and/or nitrogen in a ratio of 0.1 to 30 parts by weight with respect to 100 parts by weight of the thermoplastic resin to form a molten resin composition in which the thermoplastic resin is compatible with supercritical carbon dioxide and/or nitrogen, (II) a cooling step of cooling, the molten resin composition to a temperature of 50° to 300° C. at a tip portion of the continuous plasticator, while maintaining a pressure not less than a critical pressure of supercritical carbon dioxide and/or nitrogen, (III) a nuclei cell forming step of discharging the molten resin composition from a die connected to the tip portion of the continuous plasticator and set to an optimum expansion temperature of the molten resin composition, whereby the pressure is lowered to a level not more than the critical pressure of supercritical carbon dioxide and/or nitrogen to form cell nuclei, and (IV) an expansion controlling step of rapidly cooling the extruded product of the thermoplastic resin to a level not more than a glass transition temperature or a crystallization temperature of the resin to control a cell diameter of the expanded product, wherein the die in the step (III) has a flow velocity distribution adjusting section having a function of lowering the shear rate on the downstream side of a shear rate adjusting section having a function of generating the shear rate of the molten resin composition (hereinafter referred to simply "the shear rate") in the range of $10^2$ to $10^4$ sec$^{-1}$; this shear rate adjusting section includes a portion (an average sectional area A) in which a sectional area of a section vertical to a resin flow direction on the upstream side of a resin flow path is narrowed; the flow velocity distribution adjusting section includes a portion (an average sectional area B) in which the same section is spread on the downstream side of the flow path; and B/A is in the range of 1.3 to 20.

2. The process for preparing an expanded product of a thermoplastic resin according to claim 1 wherein the die has a function of changing a sectional area of the shear rate adjusting section.

3. The process for preparing an expanded product of a thermoplastic resin according to claim 1 wherein a resin pressure at an inlet of the shear rate adjusting section is in the range of 50to 400 kg/cm$^2$.

4. The process for preparing an expanded product of a thermoplastic resin according to claim 1 wherein a ratio C/A between the average sectional area A of the shear rate adjusting section and a sectional area C of the obtained expanded product of the thermoplastic resin is in the range of 2 to 200.

5. The process for preparing an expanded product of a thermoplastic resin according to claim 1 wherein the continuous plasticator is a tandem type extruder.

6. The process for preparing an expanded product of a thermoplastic resin according to claim 1 wherein the continuous plasticator is one extruder.

7. The process for preparing an expanded product of a thermoplastic resin according to claim 1 wherein carbon dioxide and/or nitrogen is dissolved in the thermoplastic resin in a ratio of 2 to 20 parts by weight with respect to 100 parts by weight of the thermoplastic resin.

8. The process for preparing an expanded product of a thermoplastic resin according to claim 1 wherein molten resin composition further comprises as an inorganic fine powder and/or an aliphatic carboxylic acid derivative.

9. The process for preparing an expanded product of a thermoplastic resin according to claim 8 wherein the inorganic fine powder is talc.

10. The process for preparing an expanded product of a thermoplastic resin according to claim 8 wherein the aliphatic carboxylic acid derivative is a derivative of stearic acid.

11. The process for preparing an expanded product of a thermoplastic resin according to claim 10 wherein the aliphatic carboxylic acid derivative is zinc stearate.

* * * * *

UNITED STATES PATENT AND TRADEMARK OFFICE
CERTIFICATE OF CORRECTION

PATENT NO. : 5,830,393

DATED: : November 3, 1998

INVENTOR(S) : Shigeo NISHIKAWA et al

It is certified that error appears in the above-identified patent and that said Letters Patent is hereby corrected as shown below:

ON THE TITLE PAGE, ITEM [30] FOREIGN APPLICATION PRIORITY DATA SHOULD READ:

| | | |
|---|---|---|
| July 10, 1996 | Japan | 8-180761 |
| July 10, 1996 | Japan | 8-180762 |
| July 10, 1996 | Japan | 8-180763 |

In claim 3, line 4, delete "50to 400" and insert --50 to 400-.

Signed and Sealed this

Eighteenth Day of May, 1999

*Attest:*

Q. TODD DICKINSON

*Attesting Officer*     Acting Commissioner of Patents and Trademarks